United States Patent [19]

Tsukasa et al.

[11] Patent Number: 5,367,128
[45] Date of Patent: Nov. 22, 1994

[54] FAST-RESPONSIVE ELECTROMAGNETIC BALANCE-TYPE WEIGHING APPARATUS

[75] Inventors: Fumihiro Tsukasa, Ohimachi; Hideya Fujimoto, Atsugi; Kazuhiko Horikoshi, Atsugi; Osamu Tanaka, Atsugi; Kunio Kikuchi, Minamiashigara, all of Japan

[73] Assignee: Anritsu Corporation, Tokyo, Japan

[21] Appl. No.: 678,334
[22] PCT Filed: Dec. 15, 1990
[86] PCT No.: PCT/JP90/01639
  § 371 Date: May 8, 1991
  § 102(e) Date: May 8, 1991
[87] PCT Pub. No.: WO91/11688
  PCT Pub. Date: Aug. 8, 1991

[30] Foreign Application Priority Data

Aug. 21, 1989 [JP] Japan ................... 1-214558
Jan. 26, 1990 [JP] Japan ................... 2-17455
Feb. 13, 1990 [JP] Japan ................... 2-32119
Mar. 31, 1990 [JP] Japan ................... 2-87274
Mar. 31, 1990 [JP] Japan ................... 2-87275

[51] Int. Cl.⁵ .................... G01G 1/38; G01G 3/14
[52] U.S. Cl. ...................... 177/212; 177/210 EM; 177/243
[58] Field of Search ........... 177/210 EM, 212, 243; 341/157

[56] References Cited

U.S. PATENT DOCUMENTS

| | | | |
|---|---|---|---|
| 3,589,457 | 6/1971 | Joos | 177/1 |
| 3,604,525 | 9/1971 | Blethen | 177/210 EM |
| 3,610,354 | 10/1971 | Sieswerda | 177/210 EM |
| 3,677,357 | 7/1972 | Baumgartner | 177/210 EM X |
| 3,734,218 | 5/1973 | Kupper | 177/212 |
| 3,763,485 | 10/1973 | Gatel | 341/157 |
| 4,039,036 | 8/1977 | Baumgartner et al. | 177/212 |
| 4,074,781 | 2/1978 | Melcher | 177/212 |
| 4,100,985 | 7/1978 | Meier | 177/210 EM X |
| 4,148,370 | 4/1979 | Lüchinger et al. | 177/210 EM |
| 4,150,730 | 4/1979 | Knothe et al. | 177/212 |
| 4,300,647 | 11/1981 | Knothe et al. | 177/212 |
| 4,341,275 | 7/1982 | Stadler et al. | 177/212 |
| 4,366,468 | 12/1982 | Yoneyama | 341/157 |
| 4,521,763 | 6/1985 | Murao et al. | 341/157 |
| 4,611,491 | 9/1986 | Brown et al. | 177/210 EM |
| 4,802,541 | 2/1989 | Bator et al. | 177/212 |
| 4,875,534 | 10/1989 | Kunz | 177/212 |
| 4,884,645 | 12/1989 | Knothe et al. | 177/243 X |
| 4,980,687 | 12/1990 | Newell et al. | 346/157 |

FOREIGN PATENT DOCUMENTS

| | | |
|---|---|---|
| 3144103 | 6/1982 | Germany . |
| 49-124070 | 10/1974 | Japan . |
| 56-27814 | 6/1981 | Japan . |
| 1-118328 | 8/1989 | Japan . |

OTHER PUBLICATIONS

IBM Technical Bulletin vol. 30, No. 7, Dec. 1987, Armonk, N.Y., U.S., pp. 432–435 (whole article).

*Primary Examiner*—Benjamin R. Fuller
*Assistant Examiner*—Randy W. Gibson
*Attorney, Agent, or Firm*—Frishauf, Holtz, Goodman & Woodward

[57] ABSTRACT

A novel electromagnetic balance-type weighing apparatus according to the invention includes a weighing pan/balance beam assembly (15) whose balance beam is angularly displaced as a function of the weight of an object of weighing placed on the weighing pan. An electromagnetic coil (9) is provided to generate an electromagnetic force that offsets the displacement of the balance beam of the weighing pan/balance beam assembly (15) caused by the weight of the object of weighing. A displacement detector (3, 4, 5) is provided to detect the displacement of the balance beam of the weighing pan/balance beam assembly (15). An operation unit (7) performs operations to determine a control voltage in response to the detection signal transmitted from the displacement detector (3, 4, 5). A current transducer circuit (20) generates an electric current in response to the control voltage applied to it by the operation unit (7) and supplies it to the electromagnetic coil (9). The current transducer circuit (20) comprises a negative feedback loop circuit for feeding the output current from said current transducer circuit (20) back to the input terminal of the current transducer circuit (20). A weight calculator (24) calculates the weight of the object of weighing from the output current of the current transducer circuit (20).

10 Claims, 18 Drawing Sheets

FIG.18
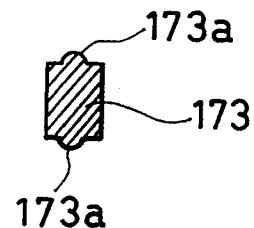
FIG.20 FIG.21
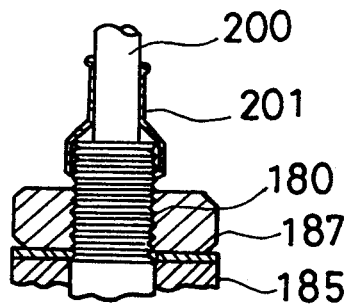 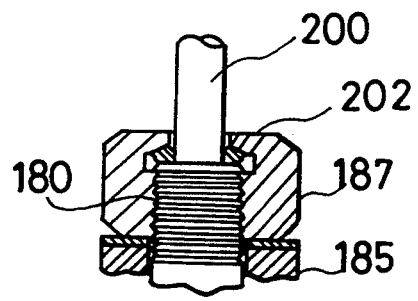

FAST-RESPONSIVE ELECTROMAGNETIC BALANCE-TYPE WEIGHING APPARATUS

BACKGROUND OF THE INVENTION

1. Technical Field

This invention relates to an electromagnetic balance-type weighing apparatus for measuring the weight of an object of weighing by detecting a signal designed to automatically generate an electromagnetic force by means of an electromagnetic coil to offset the displacement of the weighing pan (or balance beam) of the apparatus caused by the weight of the object of weighing and, more particularly, it relates to an improvement realized on such a weighing apparatus for fast-responsiveness, enhanced accuracy and hence high reliability.

2. Background Art

Weighing apparatus of a conventional differential transformer type and load cell type used in various manufacture and process lines for weighing articles (works) have gradually been replaced by those of electromagnetic balance-type as disclosed in U.S. Pat. No. 4,300,647.

The configuration of a known typical electromagnetic balance-type weighing apparatus is shown in FIG. 4 of the accompanying drawings.

In FIG. 4, reference numeral 1 generally denotes a weighing pan/balance beam assembly supported at fulcrum S selected to show a given leverage, the weighing pan being positioned at one end portion 1a of the balance beam for determining the weight of object w placed on it, reference numeral 2 denotes a circular hole provided at a bent-down section of the other end portion 1b of the balance beam of the assembly 1 and reference numeral 3 denotes a light emitter that emits beams of light toward the hole 2, while reference numerals 4 and 5 respectively denote upper and lower light sensors arranged to receive the beams of light passing through the hole 2.

Also, in FIG. A reference numeral 6 denotes a differential amplifier for detecting the difference between the beams received by the light sensor 4 and those received by the light sensor 5. Reference numeral 7 denotes a proportional integral derivative (hereinafter referred to as PID) operation unit for performing the operation of scalar multiplications, integrations and differentiations on the differential signal it receives and sending out a control voltage determined on the basis of the received signal and reference numeral 8 denotes a driving amplifier for generating a driving voltage corresponding to the received control voltage in order to produce a large electric current.

Reference numeral 9 denotes an electromagnetic (force) coil designed to pull the other end portion 1b of the balance beam opposite to the weighing pan downward by means of the electromagnetic force generated by the electric current running through it in accordance with the driving voltage, reference numeral 10 denotes a buffer amplifier for transmitting the voltage generated at resistor R by the electric current running through the electromagnetic coil 9 and reference numeral 11 denotes a low-pass filter (hereinafter referred to as LPF) for producing a DC voltage signal corresponding to the weight of the object of weighing obtained by removing those components of the signal transmitted from the buffer amplifier 10 that are responsible for oscillation and noise.

When the weighing pan 1 of an electromagnetic weighing apparatus having a configuration as described above is displaced clockwise by the weight of an object being weighed, a differential signal is generated by the difference of the amount of light received by the light sensor 5 and that received by the sensor 4, the former now being larger than the latter, so that consequently the control voltage transmitted from the PID operation unit 7 is increased to generate a force to move the weighing pan 1 counterclockwise to restore its initial position and hence the balanced condition of the weighing pan 1.

Since the force of pulling down the end of the balance beam opposite to the weighing pan generated by the electromagnetic coil 9 is linearly proportional to the driving current. The voltage present at the opposite end of the resistor R when the weighing pan 1 is balanced is a linear function of the weight of the object being weighed.

Thus, the weight of the object of weighing can be determined by detecting the output signal of the LPF 11, once the voltage output of the opposite end of the resistor is calibrated for the load of the weighing apparatus.

However, if the load applied to a conventional electromagnetic balance-type weighing apparatus as described above by an object of weighing changes stepwise and the electromagnetic coil 9 is driven to generate electromagnetic force by a voltage applied to it, the electric current caused to run through the electromagnetic coil 9 as a transient response to the inductance of the coil returns to its normal level very slowly following the curve of natural logarithm, a phenomenon that requires a long period of time for weighing an object.

This phenomenon can give rise to a very serious problem of extremely low weighing speed particularly when the weighing pan is realized in the form of a conveyor belt that moves objects of weighing on it at a given pitch and a given rate up to the weighing spot in an attempt to maximize the rate or efficiency of the weighing operation. While this problem may be dissolved to some extent by increasing the pitch of differentiation in the PID operation unit 7, such a modification made to the operation unit 7 can prohibit optimization of the control capability of the apparatus which is the principal objective of the differentiation and, at the same time, eventually cause the control system of the apparatus to oscillate and consequently deteriorate its operation.

As seen from FIG. 22 that schematically illustrates the principle of a known electromagnetic balance-type weighing apparatus as described above, the apparatus receives a force F1 at an end of the balance beam L applied by the object of weighing W to the point of weighing of the weighing pan C (realized in the form of a weighing conveyor belt for instance) located at that end of the beam L, which is supported at the fulcrum S, and a sucking force F2 of the electromagnetic coil FC at the other end of the beam L in such a way that the beam L is balanced by the two forces so that the weight of the object of weighing W on the weighing pan C can be determined from the electric current supplied to the electromagnetic coil FC to maintain the balanced condition.

If the weighing pan C (realized in the form of a weighing conveyor belt) is cleared of any object of weighing W, certain electric current should be supplied to the electromagnetic coil FC at a given rate to counterbalance the dead weight of the weighing pan C and keep the balance beam L horizontal by pulling the other end A of the balance beam L downward around the fulcrum S, because otherwise the other end A of the balance beam L will be turned upward by the dead weight of the weighing pan C. When an object of weighing W is placed on the weighing pan C, the electric current supplied to the electromagnetic coil FC should be augmented to increase its sucking force F2 in order to offset the upward movement of the other end A of the balance beam L and keep its balanced condition. The weight of the object of weighing w is determined from the increase in the rate of electric current supplied to the electromagnetic coil FC.

A known electromagnetic balance-type weighing apparatus as described above is, however, accompanied by the problems as described below.

(a) Since the dead weight of the weighing pan C is counterbalanced by the sucking force F2 of the electromagnetic coil FC, the latter should be constantly fed with electricity even when the weighing pan C does not have any object w on it in order to hold the balance beam L horizontal and therefore the level of power consumption of such an apparatus is not negligible.

When the weighing pan C is realized in the form of a conveyor belt that moves objects of weighing W at a given pitch and a given rate, the dead weight to be offset by the sucking force of the electromagnetic coil FC includes the weight of the conveyor belt and that of the electric motor for driving the conveyor belt and therefore the power requirement of such an apparatus can be considerable. This in turn gives rise to a high rate of heat generation by the electromagnetic coil and the high temperature caused by the generated heat can adversely affect the accuracy of operation of the electromagnetic coil and therefore that of the electromagnetic balance-type weighing apparatus.

(b) In order to accommodate any heavy object on the weighing pan C and keep the balanced condition of the beam L by means of the sucking force F2 of the electromagnetic coil FC, the ratio of the distance l1 between the fulcrum S of the balance beam L and the point of weighing of the weighing pan C to the distance l2 between the fulcrum S and the point of receiving the sucking force of the electromagnetic coil FC should be strongly in favor of the latter. Because of the inversely high ratio of l1 to l2 and the remarkable weight imbalance between the weighing pan C side and the other side of the balance beam L as viewed from the fulcrum S, the balance beam L is highly sensitive to and can resonate with external vibrations (such as the vibration of the floor where the weighing apparatus is installed), that can also adversely affect the accuracy of operation of the apparatus.

Besides, the balance beam L can significantly vibrate when an object of weighing W is placed on or removed from the weighing pan C because of an abrupt weight imbalance there, a phenomenon that also adversely affects the accuracy of the weighing operation of the apparatus.

FIG. 23 of the accompanying drawings schematically illustrates the configuration of a known water-proof weighing apparatus using a differential transformer.

A weighing pan C (in the form of a conveyor belt for instance) is arranged external to a housing B of the apparatus main body and at one end portion of the balance beam L which is separated from the fulcrum S by a short distance for receiving an object of weighing on a part of it.

Supports Ca, Ca for supporting the weighing pan C stand upright through respective holes Ba, Ba of the housing B in such a manner that the weighing pan C can freely move upward and downward. A spring SP is rigidly fitted to the other end portion of the balance beam L as viewed from the fulcrum S and the balance of the beam L is secured by the resilient deformation of the spring SP. The spring SP acts also as a sensor spring that provides (angular) displacement of the balance beam L with a magnitude which is proportional to the weight of the object of weighing W on the weighing pan C. With such an arrangement, the weight of the object of weighing W can be determined by detecting the displacement of the balance beam L by means of a differential transformer T whose core TC is arranged at the one end portion of the balance beam L opposite to the weighing pan C.

If the object of weighing W being weighed on a weighing apparatus having a configuration as described above contains liquid in it, some of the liquid content can flow into the main body of the weighing apparatus through the whatever small space between the holes Ba, Ba of the housing B and the respective supports Ca, Ca. A similar problem may arise when the weighing pan C is washed with water.

In order to eliminate such a problem, conventionally a cylindrical protector hood Pa is fitted around each of the supports Ca, Ca and a water-proof cylinder Pb is arranged along the edge of each of the holes Ba, Ba of the housing B, as shown in FIG. 23. A drain ridge Pc is also arranged around the outer periphery of the top of each of the water-proof cylinders Pb, Pb whenever necessary.

However, a water-proof weighing apparatus of the type as described above is accompanied by the following problems.

(a) while the clearance between each of the drain ridges Pc, Pc of the water-proof cylinders Pb, Pb and the corresponding water-proof hood Pa should be minimized in order to effectively prevent liquid from flowing into the housing B, it should be large enough to avoid any possible contact between the supports Ca, Ca and the respective water-proof cylinders Pb, Pb, hoods Pa, Pa and the drain ridges Pc, Pc that can be brought about by dust and/or misalignment of the supports Ca, Ca and the respective holes and secure free movement of the supports Ca, Ca. A large clearance by turn hinders complete protection of the weighing apparatus against liquid.

(b) Since the inside of the casing is exposed to atmosphere, dew can be formed within the weighing apparatus.

While the space between the housing B and the supports Ca, Ca may be airtightly covered by elastic members D, D as illustrated in FIG. 24, such an arrangement is also accompanied by the following drawbacks.

(c) The resilient force of the elastic members D, D applied to supports Ca, Ca adversely affects the operation of the weighing apparatus so that the displacement of the balance beam L does not correctly represent the weight of the object W being weighed.

(d) Since the housing B is airtightly sealed, the internal air pressure of the housing B is changed by the temperature of the inside of the housing B to consequently give rise to errors in measurement.

(e) Since the casing B is airtightly sealed, the air contained in the housing B acts as a cushion that can unintentionally vibrate the balance beam L, requiring some time before the beam returns to a stationary condition.

It should be noted that similar problems are observed with any conventional electromagnetic balance-type weighing apparatus, where the differential transformer T is replaced by an electromagnetic coil FC fitted to one end portion of the balance beam L as illustrated in FIG. 22.

In short, any existing electromagnetic balance-type weighing apparatus is devoid of fast-responsiveness and does not meet the requirement of high precision and high reliability.

OBJECTS AND SUMMARY OF THE INVENTION

In view of the circumstances as described above, it is therefore an object of the present invention to provide a fast-responsive and improved electromagnetic balance-type weighing apparatus.

Another object of the present invention is to provide an improved electromagnetic balance-type weighing apparatus that meets the requirement of high precision and high reliability.

According to a first aspect of the invention, the above objects of the invention are achieved by providing an electromagnetic balance-type weighing apparatus comprising:

weighing pan means for being displaced as a function of the weight of an object of weighing placed thereon;

electromagnetic coil means for generating an electromagnetic force to counterbalance the displacement of the weighing pan means;

displacement detector means for detecting the displacement of the weighing pan means;

operation means for performing operations to determine a control voltage on the basis of a detection signal transmitted from the displacement detector means;

current transducer means for converting the control voltage from the operation means into a corresponding electric current and supplying it to the electromagnetic coil means; and weight calculator means for calculating the weight of the object of weighing according to the corresponding electric current supplied from the current transducer means.

According to a second aspect of the invention, there is provided an electromagnetic balance-type weighing apparatus of the type similar to the one as described above having a weighing pan arranged at an end of the balance beam pivotally supported by a fulcrum, the weight applied to the weight-sensing spot of the weighing pan by an object of weighing placed on it being counterbalanced by the electromagnetic force generated by an electric current supplied to the electromagnetic coil arranged at the other end of the balance beam, the weight of the object being determined by detecting the rate of the electric current supplied to the electromagnetic coil, wherein a balancing weight is arranged at the end of the balance beam opposite to the weighing pan so that the balance beam is balanced under the condition where the weighing pan is either loaded or unloaded with the object of weighing.

According to a third aspect of the invention, there is provided an electromagnetic balance-type weighing apparatus comprising:

a main body of the electromagnetic balance-type weighing apparatus for determining the weight of an object of weighing on the basis of the rate of the electric current supplied to an electromagnetic coil when a load applied to the weighing pan by the object of weighing is offset by the electromagnetic force generated by the electromagnetic coil; and a housing for accommodating the electromagnetic balance-type weighing apparatus provided with a number of holes through which a weight-sensing portion of the weighing pan is projecting upward; wherein a clearance between the housing and the weight-sensing portion is airtightly sealed by elastic members and a number of ventilation pores are arranged at locations other than those of the holes for securing air passage to annihilate any difference of air pressure between the outside and the inside of the housing that may be caused by expansion or contraction of the elastic members.

With an electromagnetic balance-type weighing apparatus according to the first aspect of the invention, since the electromagnetic coil means is driven to operate by the electric current supplied from the current transducer means, the current running through the electromagnetic coil means changes its flow rate quickly responding to the changes in the control voltage so that the displacement of the weighing pan means may be quickly offset by the electromagnetic force applied by the electromagnetic coil means to enhance the fast-responsiveness of the weighing apparatus.

With an electromagnetic balance-type weighing apparatus according to the second aspect of the invention, since the imbalance of mass between the weighing pan and the opposite end of the balance beam is reduced by an additional weight so that the requirement for electric current through the electromagnetic coil is significantly reduced when the weighing pan is out of load to consequently reduce the amount of heat generated by the coil and the weighing pan becomes by far less sensitive to external vibrations as compared with any known comparable weighing apparatus, the responsiveness of the weighing apparatus to any external object of weighing is remarkably enhanced in terms of the time required for weighing. Therefore, such a weighing apparatus will be characterized as highly accurate and reliable.

Finally with an electromagnetic balance-type weighing apparatus according to the third aspect of the invention, since the clearance between the holes arranged at the top of the housing and the weight-sensing portion of the weighing pan is airtightly sealed by elastic members to protect the apparatus against external liquid and the internal air pressure of the housing does not show any significant changes because of the ventilation pores arranged on the casing even if the volume of the air inside the casing may be increased or reduced depending on the temperature of the air, making the weight-sensing portion of the weighing pan totally unaffected by the elastic members, the main body of the electromagnetic balance-type weighing apparatus can quickly restore its stabilized condition under any circumstances to become ready for weighing. Moreover, since the degree of deflection of the elastic members is kept constant regardless of the weight of the object of weighing so long as the main body of the electromagnetic balance-type weighing apparatus is under a stable condition and hence not affected by the degree of resilience of the elastic members, the weighing apparatus is highly responsive to the weight of the object of weighing and provides a high accuracy and reliability of weighing.

BRIEF DESCRIPTION OF THE DRAWINGS

Now, the present invention will be described in greater detail by referring to the accompanying drawings that illustrate preferred embodiments of the invention, in which;

FIG. 18 is an enlarged sectional view of a packing of the embodiment of FIG. 11;

FIGS. 20 and 21 are schematic illustrations showing the airtight structure of a cable port of the embodiment of FIG. 11, through which a support column runs;

DETAILED DESCRIPTION OF THE PREFERRED EMBODIMENTS

Now, certain preferred embodiments of the invention will be described by referring to the accompanying drawings.

Figure 1:
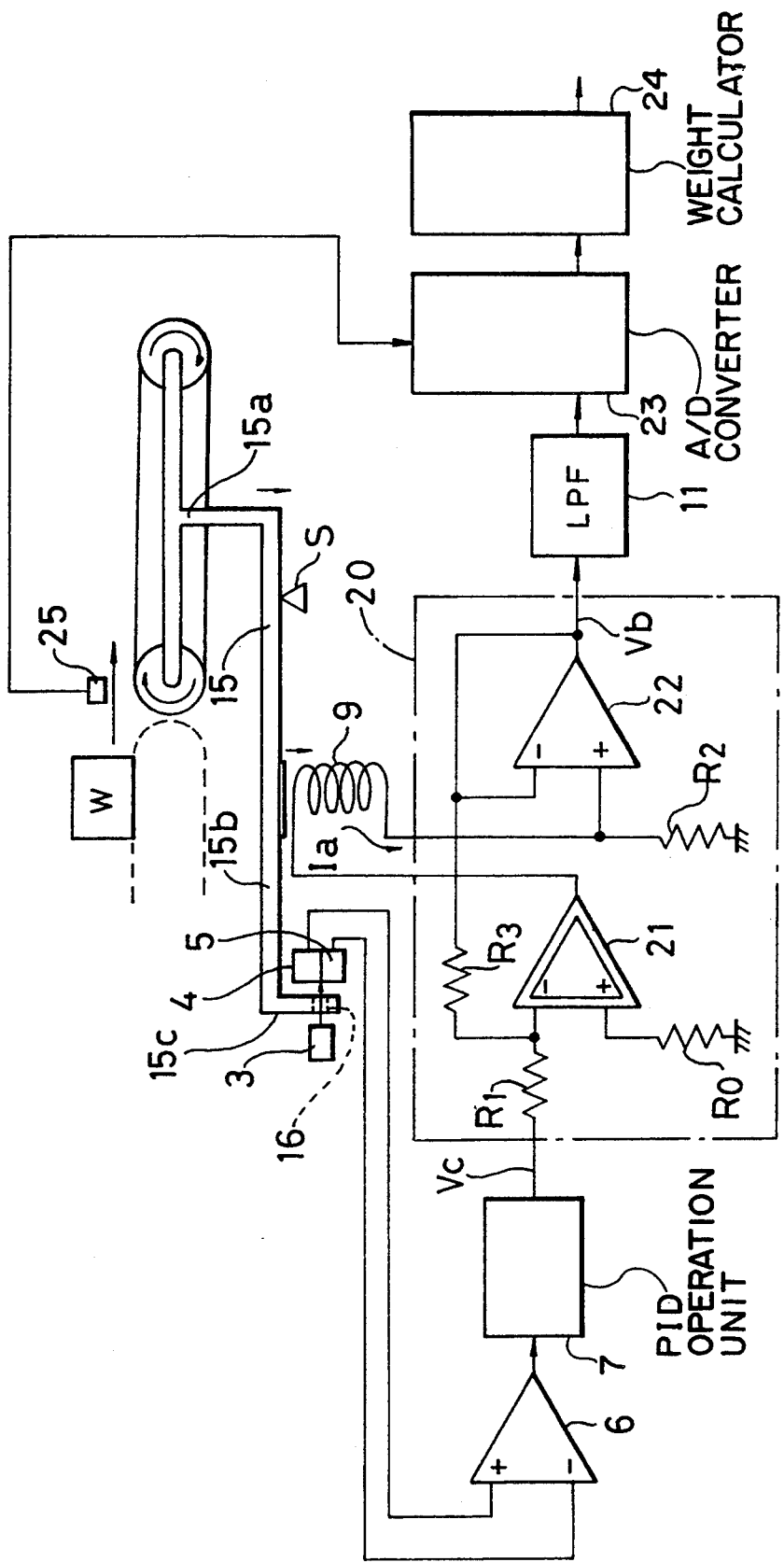
FIG. 1 is a schematic diagram showing the configuration of a first embodiment of the electromagnetic balance-type weighing apparatus of the invention.
Figure 4:
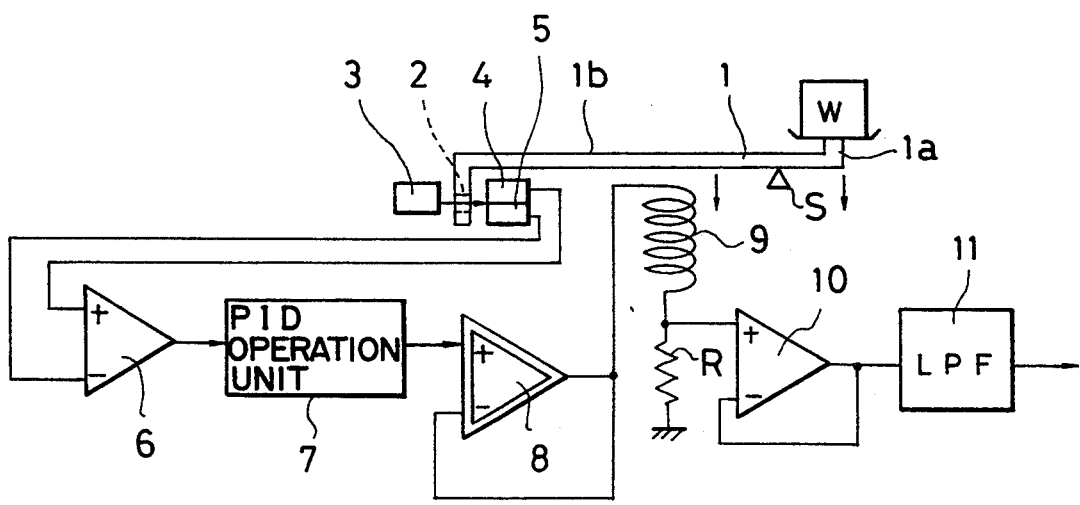
FIG. 4 is a schematic diagram showing the configuration of a known electromagnetic balance-type weighing apparatus.

FIG. 1 shows a schematic diagram of the configuration of a first preferred embodiment of the electromagnetic balance-type weighing apparatus of the invention, where the components which are similar to those of FIG. 4 are indicated by identical reference numerals.

In FIG. 1, reference numeral 15 denotes a weighing pan/balance beam assembly, of which the weighing pan is realized in the form of a conveyor belt fitted to one end portion 15a of the balance beam pivotally supported by a fulcrum S at a given point between the opposite ends of the beam and reference numeral 16 denotes a circular hole formed at a bent-down section 15c of the other end portion 15b of the balance beam of the weighing pan/balance beam assembly 15. Light sensors 4, 5 receive beams of light coming from a light emitter 3 through the hole 16 and transmit signals corresponding to the beams of light they receive and hence representing the amount of displacement of said balance beam to a differential amplifier 6. The output signal from the differential amplifier is transmitted to a PID operation unit 7, which by turn brings forth a control voltage that corresponds to the load applied to the weighing pan 15.

It should be noted here that the PID operation unit 7 may be replaced by a control unit based on the most advanced theories for system control such as a fuzzy control unit involving a membership function. What is important here is that a control unit put to use should be capable of performing mathematic operations on various control parameters in such a manner that said displacement signal may approach zero as close as possible.

Also, in FIG. 1, reference numeral 20 denotes a current transducer circuit that supplies an electric current to an electromagnetic coil 9 at a rate corresponding to the control voltage produced by the PID operation unit 7.

The current transducer circuit 20 is so designed that it detects by means of the voltage applied to a resistor R2 the electric current running through the electromagnetic coil 9, which is driven by the output electric current of a driving amplifier 21 to whose inverted input terminal the control voltage is applied by way of a resistor R1 and the detected voltage is fed back to the inverted input terminal of the driving amplifier 21 by way of the non-input terminal of a buffer amplifier 22, to which it is applied, its output terminal and then a resistor R3 (=R1). The non-inverted input terminal of the driving amplifier 21 is grounded by way a resistor R0, while the inverted input terminal of the buffer amplifier 22 is connected to its output terminal.

Reference numeral 23 denotes an A/D converter to be used for converting gross weight signals transmitted from the buffer amplifier 22 by way of a LPF 11 into digital signals and reference numeral 24 denotes a weight calculator for determining the weight of the object of weighing by subtracting the weight of the weighing pan 15 from the total load of the weighing pan represented by the gross weight signal.

Reference numeral 25 denotes a sensor for determining the timing of bringing an object of weighing onto the weighing pan 15. The A/D converter 23 proceeds to an operation of converting a gross weight signal into a corresponding digital signal only when time T has elapsed after receiving a timing signal.

The operation of an electromagnetic balance-type weighing apparatus according to the invention and having a configuration as described above will now be described by referring to the timing charts A through G shown in FIG. 2.

As an object of weighing W is put on the weighing pan 15, the load of the weighing pan will show a change as expressed by the trapezoidal line of chart A.

The PID operation unit 7 adds the derivative (chart B) to the integral and proportional component (chart C) and transmits a signal representing the resultant waveform (chart D) which is generally found between $-V1$ and $-V2$.

Figure 2:
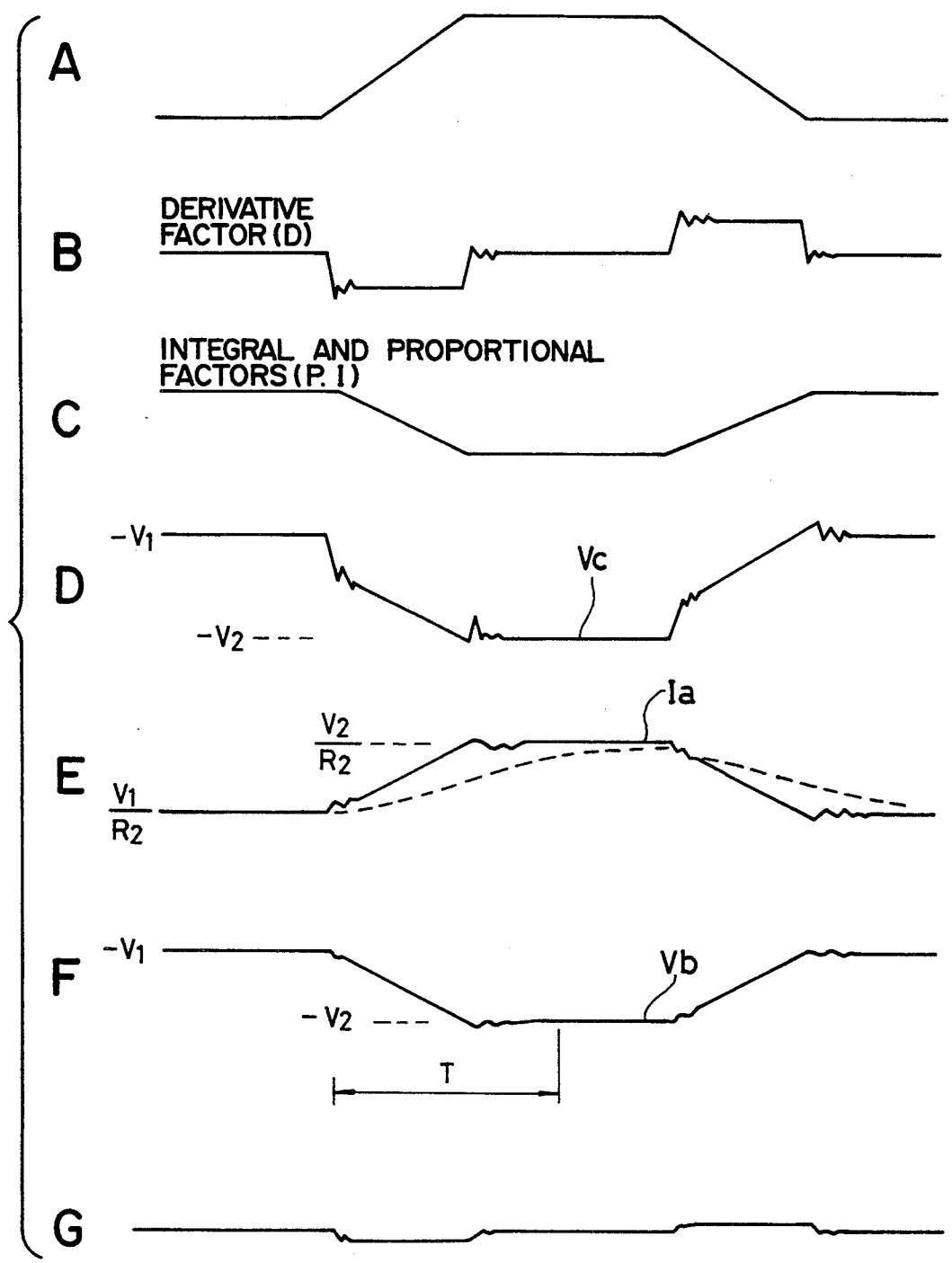
FIG. 2 is a graphic illustration of waveforms of signals used for the operation of the embodiment of FIG. 1.

The driving amplifier 21 quickly responds to the control voltage Vc as it is fed back from the buffer amplifier 22 so that the output current Ia of the driving amplifier 21 is converged to a value determined by $V2/R2$ as shown by chart E in FIG. 2.

It will be easily understood that the rate of the convergence is considerably higher than that of the output current of the driving amplifier of a conventional apparatus which is driven to operate by voltage.

At this stage, the voltage applied to a terminal of the resistor R2, or the power voltage Vb of the buffer amplifier 22 will be $-V2$ volts as shown by chart F in FIG. 2.

As the rate of the electric current running through the electromagnetic coil 9 is quickly modified, responding to the control voltage, the weighing pan/balance beam assembly 15 quickly regains its balanced condition if it is temporarily displaced by the load applied to it by the object of weighting placed on the weighing pan.

The gross weight signal obtained at time T after an object of weighing is put on the weighing pan is converted into a digital signal and sent to the weight calculator 24, which determines the weight of the object of weighing.

Figure 3:
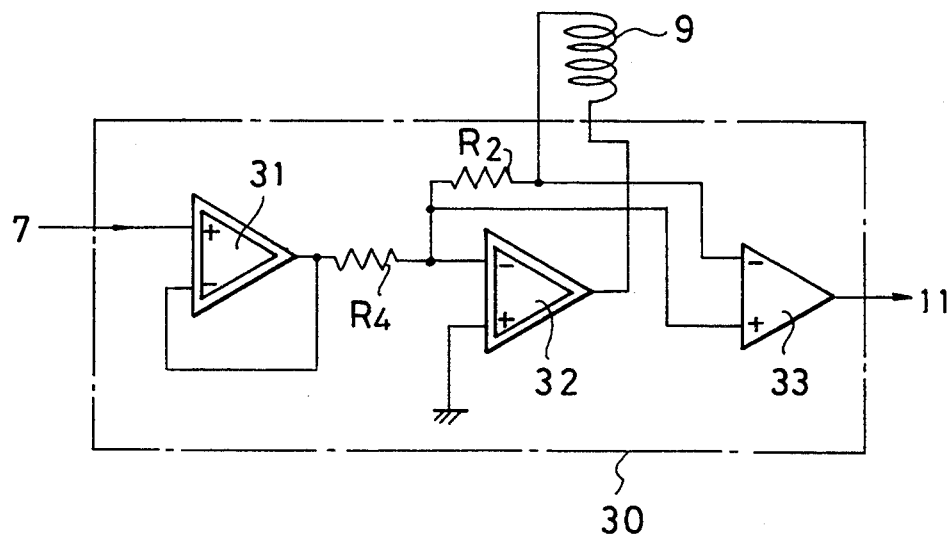
FIG. 3 is a circuit diagram of a modified embodiment obtained from the embodiment of FIG. 1.

Since the electric current running through the electromagnetic coil 9 changes itself quickly responding to the variation in the control voltage, the time T can be made very short and the efficiency of operation of the weighing apparatus will be maximized by so selecting the rate of moving objects of weighing that the time required for each object of weighing to stay on the weighing pan is very close to T.

while the current transducer circuit 20 of the above embodiment is constituted by a driving amplifier 21 and a buffer amplifier 22, it may be alternatively realized in the form of a current transducer circuit 30 having a configuration as shown in FIG. 3. The current transducer circuit 30 illustrated in FIG. 3 comprises a driving amplifier 31 for receiving a control voltage from the PID operation unit 7 and providing a transducer voltage gain "1" to produce a large electric current and an inversion type driving amplifier 32 connected with a resistor R2 for detecting electric current and the electromagnetic coil 9 to set up a negative feedback loop and a resistor R4 through which it receives the output signal of the driving amplifier 31. Reference numeral 33 denotes a differential amplifier for converting the terminal voltage of the resistor R2 into a weight signal.

Similarly, the two light sensors 4, 5 of the above embodiment for detecting the displacement of the weighing pan may be replaced by non optical means such as a differential transformer.

As described above, since the first embodiment of the electromagnetic balance-type weighing apparatus of the invention is so designed as to use its electromagnetic coil to set up a negative feedback loop and drive it to operate by means of the electric current running therethrough, the current quickly responds to changes in load applied to the weighing pan and consequently the time required for the apparatus from the detection of a change in the load caused by an object of weighing to the determination of the weight of the object is significantly reduced to improve the efficiency of weighing operation.

It should be also noted that, in the above embodiment, the A/D converter contributes to the improvement of the reliability of the electromagnetic balance-type weighing apparatus as it converts the analog weight signal obtained from the LPF 11 into a corresponding digital value, which is then supplied to the weight calculator 24 so that the latter can perform arithmetic operations quickly and accurately.

A voltage/frequency converter (hereinafter referred to as V/F converter) may be suitably used for the A/D converter because it can simplify the overall configuration and reduce the cost of the A/D conversion circuit.

Figure 8:
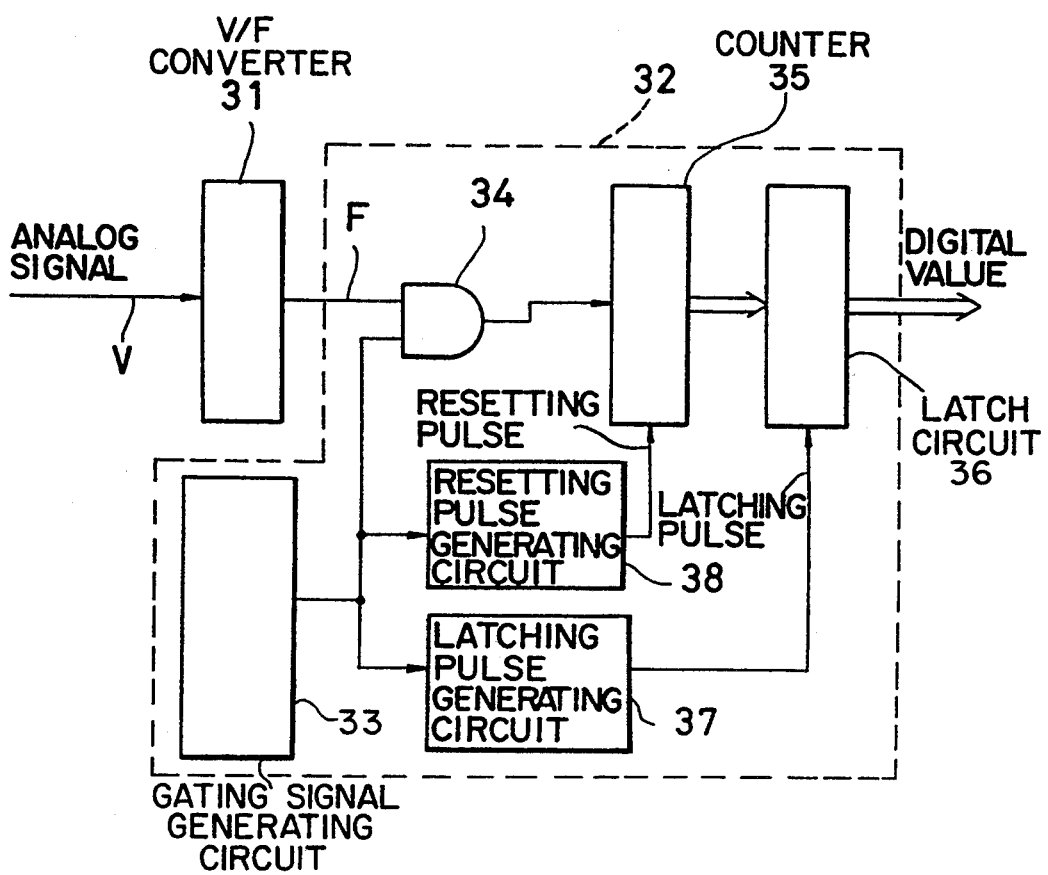
FIG. 8 is a block diagram of another A/D converter that can also be used for the embodiment of FIG. 1.

FIG. 8 shows a typical configuration of an A/D conversion circuit using a V/F converter.

In FIG. 8, reference numeral 31 denotes a V/F converter that, upon receiving an analog signal in the of voltage, generates a pulse signal with a frequency F that corresponds to the voltage v. For instance, if the input voltage varies from zero to the other end of the scale (e.g., 10 volt), the frequency of the output signal may vary from zero to 2 MHz as a linear function of the voltage.

Also, in FIG. 8, 32 denotes a counter circuit for counting the frequency of the pulse signal coming from the V/F converter. More specifically, it lets the pulse signal pass through an AND circuit 34 and then to a N-bit counter 35 for a given period of time by using a gating signal transmitted from a gating signal generating circuit 33 and causes a latch circuit 36 to latch the result of the counting and generate an output signal representing the digital value of the count.

Reference numeral 37 denotes a latching pulse generating circuit that generates a latching pulse for each gating pulse which is slightly delayed relative to the rising edge of the gating pulse and reference numeral 38 denotes a resetting pulse generating circuit that generates a resetting pulse to reset the counter 35 for each latching pulse which is slightly delayed relative to the latching pulse but slightly precedes the rising edge of the next gating pulse.

with such an arrangement, whenever the input analog voltage v is varied, the count value to be latched to the latch circuit 36 for a given period of time is altered accordingly.

An A/D conversion circuit having a configuration as described above may be unable to respond to changes in analog signals quickly and accurately that contain high frequency components if the weight signal (analog signal) of the electromagnetic balance-type weighing apparatus needs highly accurate measurement and analysis for its waveform because a relatively long gating time of 32 milliseconds (64K/2 MHz) may be required if a resolution of 16 bits should be achieved.

This problem may be resolved by reducing the gating time to, for instance, one-eighth of 32 milliseconds, or 4 milliseconds, to increase the rate of sampling and adding eight consecutive counts to realize a resolution of 16 bits. However, the time required to reset the counter 35 should be made negligibly short relative to the period of a pulse signal with the highest possible frequency generated by the V/F converter 31 if such an arrangement should prove practically feasible.

Differently stated, since the number of pulses given to the counter during the time for resetting the counter is not included in each count, the sum of the consecutive counts inevitably and significantly differs from the correct number of pulses and consequently the apparatus will become poorly accurate and reliable.

A conceivable solution to this problem may be the use of a high speed device such as an emitter-coupled logic (hereinafter referred to as ECL), a logic gate that operates at very high speed. But such a high speed device is very costly and emits heat at a high rate, giving rise to additional problems including the drift phenomenon that should be newly addressed. Therefore, the use of such a device does not constitute a recommendable solution to the problem.

Figure 5:
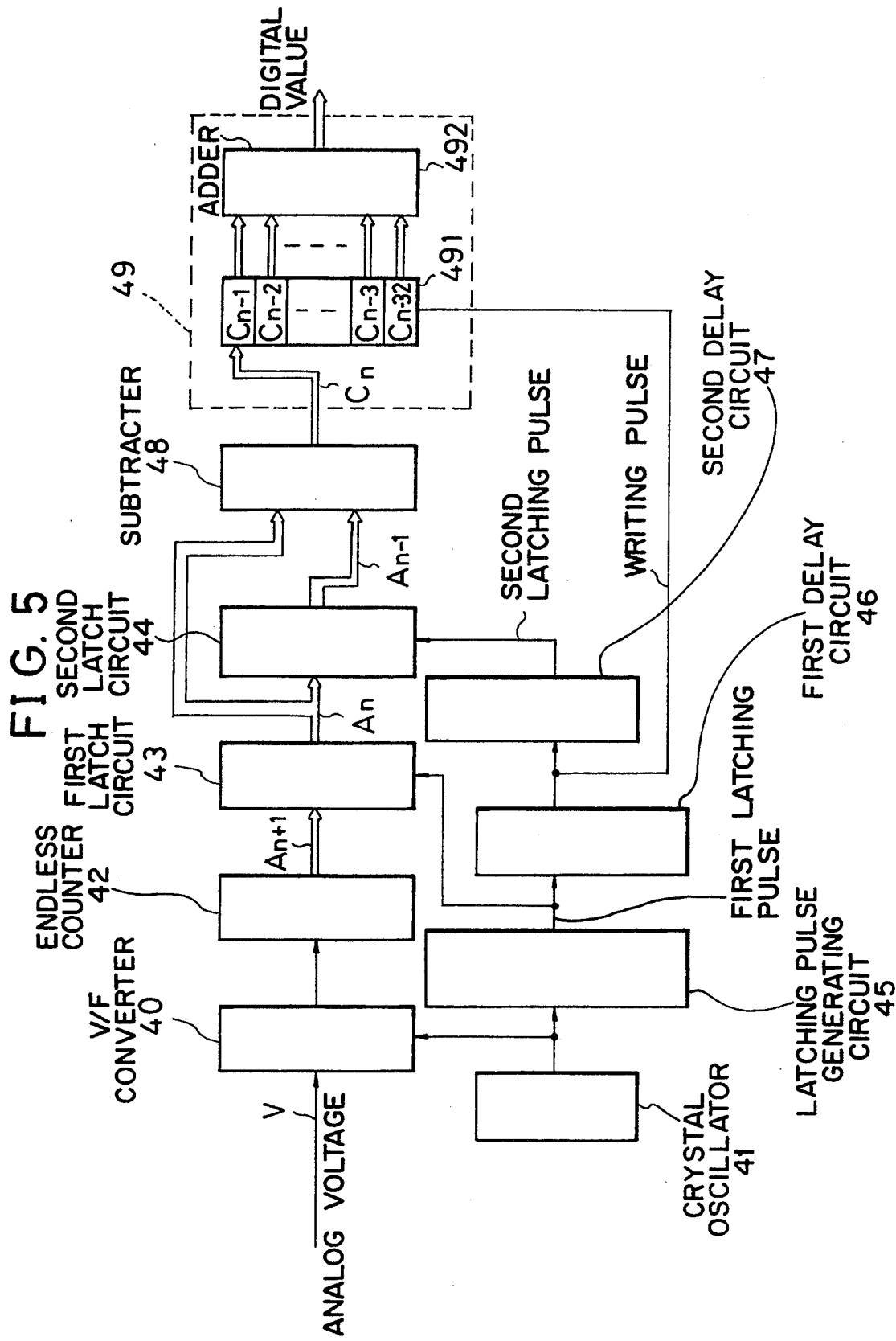
FIG. 5 is a block diagram of an A/D converter that can be used for the embodiment of FIG. 1.

FIG. 5 shows a block diagram of an A/D converter proposed as a possible solution to overcome the above problem.

In FIG. 5, reference numeral 40 denotes a V/F converter that generates a pulse signal having a frequency that varies as a linear function of the analog voltage applied to it. It may be typically a synchronous V/F converter that generates an output pulse signal in synchronism with the clock signal transmitted from a crystal oscillator 41, the frequency of said output pulse signal varying between zero to 2 MHz in response to the variance in the analog voltage between zero and 10 volt as in the case of the V/F converter 31 described earlier.

Also, in FIG. 5, reference numeral 42 denotes a counter, e.g., 16-bit endless counter, for continuously counting the pulse signals transmitted from the V/F converter 40.

Reference numeral 43 denotes a first latch circuit for latching the count output from the endless counter 42 each time it receives a first latching pulse, while reference numeral 44 denotes a second latch circuit for latching the output of the first latch circuit 43 each time it receives a second latching pulse.

Reference numeral 45 denotes a latching pulse generating circuit for dividing the frequency of a clock signal coming from the crystal oscillator 41 and generating a first latching signal for every 1 millisecond and reference numeral 46 denotes a first delay circuit for generating a write pulse with a short delay of time d1 relative to the first latching pulse, while reference numeral 47 denotes a second delay circuit for generating a second latching pulse with a slight delay of time d2 relative to the write pulse.

Reference numeral 48 denotes a subtracter for subtracting the output of the second latch circuit 44 from the output of the first latch circuit 43.

The result of the subtraction is equal to the value Cn obtained by subtracting the reading An−1 of the endless counter 42 at time Tn−1 when a first latching pulse is generated from the reading An of the counter at time Tn for generation of the next latching pulse and represents a digital value that corresponds to the level of voltage from Tn−1 to Tn expressed in analog form.

Since the digital value is equal to the difference between two pulse signals latched with an interval of 1 millisecond that can vary between zero and 2 MHz, it shows a resolution of "2,000" or 11 bits at maximum.

Reference numeral 49 denotes an integral circuit that generates an output representing the accumulated sum of the results of a given number of times (32) of subtractions made to consecutive inputs and comprises a shift register 491 for sequentially storing the results of subtraction and an adder 492 for adding the data stored in the shift register 491.

Now, the operation of the A/D converter having a configuration as described above will be explained by referring to the timing charts A through G shown in FIG. 6.

Figure 6:
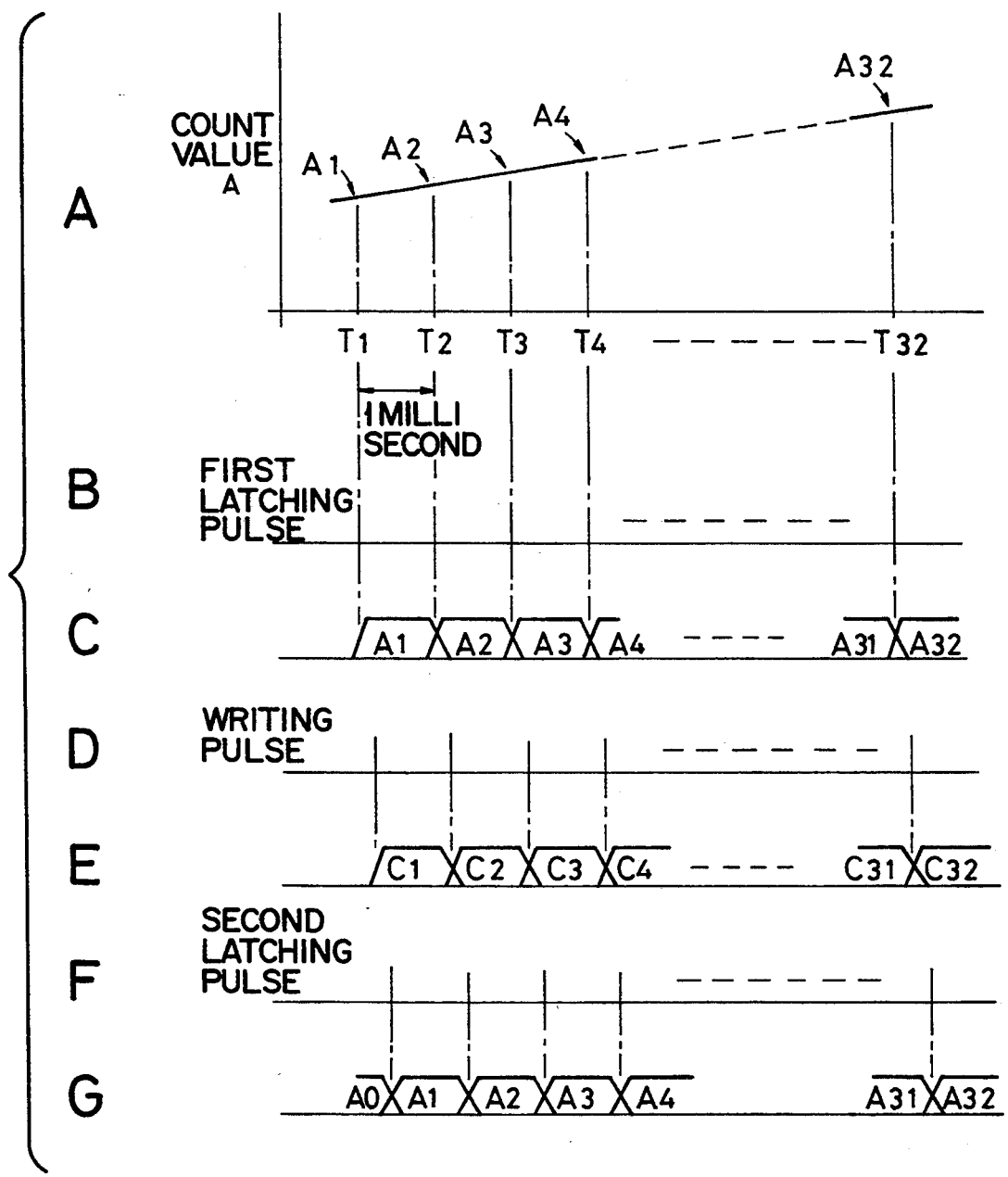
FIG. 6 is a timing chart to illustrate the operation of the A/D converter of FIG. 5.

When an analog input signal is given to the V/F converter 40, a pulse signal having a frequency that corresponds to the voltage of the input signal is generated and sent to the endless counter 42 to augment the reading of the counter as shown by chart A in FIG. 6.

Then, a corresponding latching pulse is generated at time T1 for the pulse signal as illustrated in chart B of FIG. 6 to latch count value A1 to the first latch circuit 43 as shown in chart C of FIG. 6 and a write pulse (chart D in FIG. 6) which is generated with a slight delay relative to the latching pulse triggers an operation of subtracting the immediately preceding count value (A0) stored in the second latch circuit 44 from the count value A1 to give out the difference C1, which is then stored in the shift register 491 (chart E of FIG. 6).

As a second latching pulse generated with a short delay relative to the write pulse is entered to the second latch circuit 44 as shown by chart F in FIG. 6, count A1 that has been latched to the first latch circuit 43 is then latched to the second latch circuit 44 as shown by chart G in FIG. 6.

Thereafter, the difference of two consecutive readings is stored in the shift register 491 for every one millisecond in the same manner.

The output of the adder 492 when the results of 32 subtractions C2 through C33 are stored in the shift register 491 is a digital value that corresponds to the level of the voltage expressed in analog form for a period of 32 milliseconds from T1 to T33 and, since the endless counter 42 continuously keeps on counting, no errors are accumulated during the period, making the output of the adder to show a resolution, or an accuracy, of 16 bits.

When the result of the next subtraction C34 is stored in the shift register 491, the output of the adder 492 will be a digital value that corresponds to the level of the voltage in analog form between T2 and T34. In the same way, a digital value with an accuracy of 16 bits will be obtained for the corresponding analog voltage for every 1 millisecond.

There may be a case where the reading of the endless counter exceeds its limit and shows a value An smaller than the value An−1 of the reading immediately before it. However, since the subtracter 48 is so designed that the subtraction is operated by assuming that the seventeenth bit of the latched output value An of the first latch circuit 43 is always "1" and therefore the operation of subtraction is always conducted without mistake.

while the A/D converter in FIG. 5 produces a digital value with a resolution of 16 bits by accumulating the (32) results of consecutive subtractions stored in the shift register 491, it may be so designed that all results of subtractions are stored in the shift register 491 and the stored data may be selectively retrieved from it with a required level of resolution each time when a waveform analysis is conducted.

Figure 7:
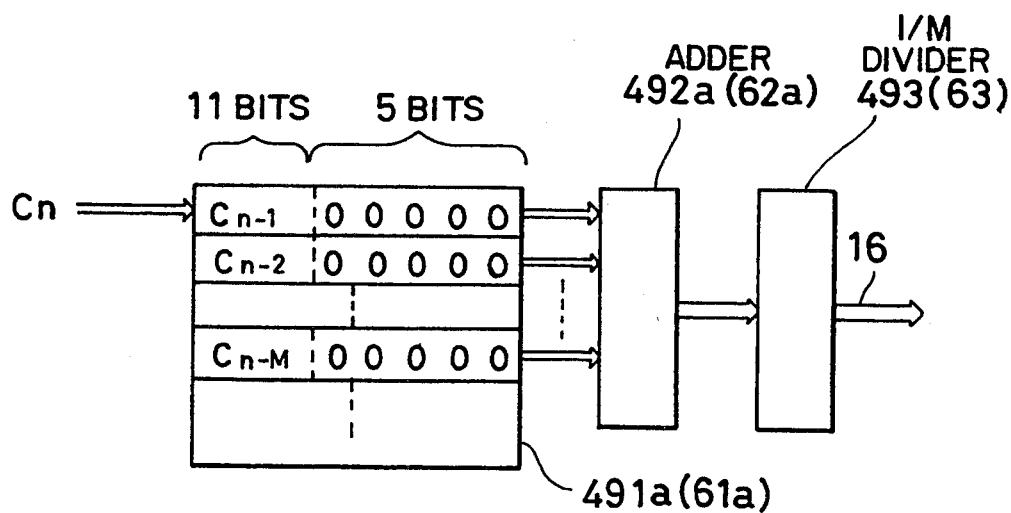
FIG. 7 is a block diagram of part of an A/D converter obtained by modifying the one shown in FIG. 5.

Likewise, while the A/D converter in FIG. 5 adds the results of subtractions with a level of resolution of 11 bits without further processing them, it may be so configured as to obtain a resolution of 16 bits as illustrated in FIG. 7, where each result of subtraction is multiplied by $2^5$ (or five "0"s are added to the end of the result as lower five digits) in shift register 491a and M (an arbitrary number) consecutive results of subtractions expressed by using 16 bits are added in adder 492a, the sum being averaged by a 1/M divider 493.

Furthermore, while the A/D converter in FIG. 5 comprises a 16-bit endless counter 42, the counter may be replaced by any counter that can count numbers within a limit defined by the number obtained by dividing the output frequency corresponding to the upper end of the scale of the V/F converter by the latching frequency. Moreover, it may be also apparent that the A/D converter in FIG. 5 may be replaced with a comparable 12-bit or higher-bit counter.

Since an A/D converter as described above is so designed that outputs of the V/F converter are continuously recorded for a given period of time to determine the difference between the counts at the beginning and at the end of the period for digitization, the digitization may be performed to obtain a desired level of accuracy with a relatively narrow pitch of sampling of incoming analog signals and therefore without requiring a high speed counter to afford a high accuracy of measurement and a high speed waveform analysis.

Figure 9:
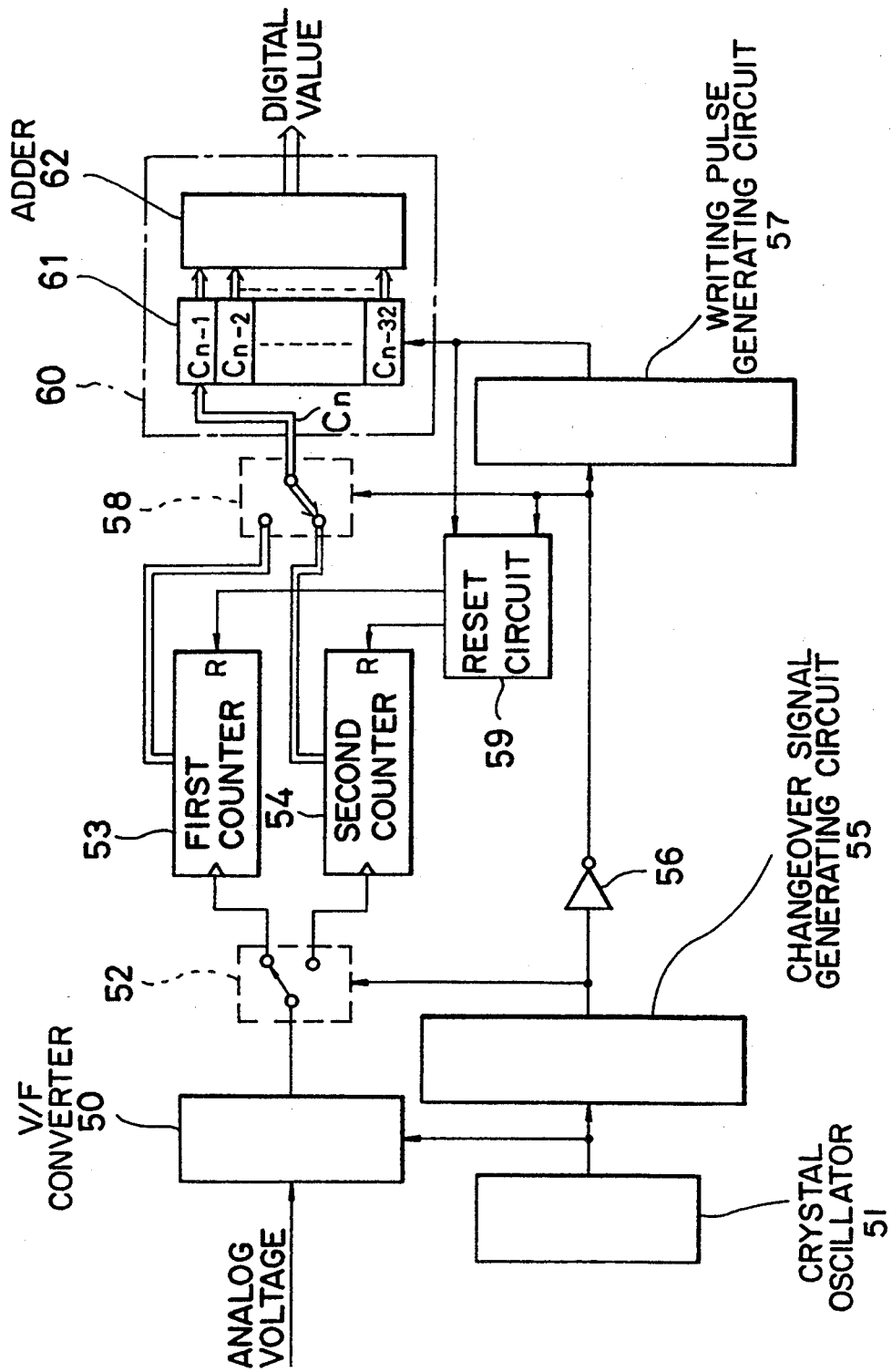
FIG. 9 is a block diagram of still another A/D converter that can also be used for the embodiment of FIG. 1.

FIG. 9 shows a block diagram of an alternative A/D converter proposed to eliminate the problem of the A/D converter of FIG. 8.

In FIG. 9, reference numeral 50 denotes a V/F converter for producing a pulse signal with a frequency corresponding to the analog voltage applied thereto. It may typically be a synchronous V/F converter that produces an output pulse signal in synchronism with the clock signal transmitted from a crystal oscillator 51. The frequency of the pulse signal transmitted from the V/F converter may vary between zero and 2 MHz in response to the analog voltage applied thereto that can vary zero to 10 volt as in the case of the V/F converter of FIG. 8.

Also, in FIG. 9, reference numeral 52 denotes an input changeover switch that forwards the pulse signal from the V/F converter 50 either to a first counter 53 or to a second counter 54 depending on the level of the changeover signal it receives. The first and second counters 53, 54 are 12-bit binary counters.

Reference numeral 55 denotes a changeover signal generating circuit for generating input changeover signals having a level reversed at a frequency, e.g., once for every millisecond, obtained by dividing the frequency of the clock signal from the crystal oscillator 51 and reference numeral 57 denotes a write pulse generating circuit for generating a write pulse each time it receives an output changeover signal with a slight delay of time d1 relative to the rising or falling edge of the output changeover signal which its obtained by reversing the corresponding input changeover signal by means of an inverter 56.

Reference numeral 58 denotes an output changeover switch for selectively transmitting the output of either the first counter 54 or the second counter 53 depending on the level of the output changeover signal. The cut put changeover switch 58 operates reversely relative the input changeover switch 52 and, therefore, selects the output of the second counter 54 when the first counter 53 is operating and that of the first counter 53 when the second counter 54 is operating.

Reference numeral 59 denotes a resetting circuit for slightly delaying write pulses by time d2 and resetting whichever counter that has completed its operation.

Reference numeral 60 is an accumulator circuit for producing the total of given number of (32) consecutive inputs, said accumulator circuit comprising a shift register 61 for sequentially storing the counts transmitted from the output change-over switch 58 in synchronism with the corresponding write pulses and an adder 62 for adding the data stored in the shift register.

It should be noted that the maximum digital value that can be stored in the shift register 61 is "2,000" which is obtained by counting the number of pulses for 1 millisecond of a 2 MHz pulse signal that represents the maximum frequency for the apparatus. Differently stated, the apparatus has a resolution of 11 bits.

Now the operation of an A/D converter having a configuration as described above will be described by referring to the timing charts in FIG. 10.

When an input analog signal is applied to the V/F converter 50, it transmits a pulse signal having a frequency corresponding to the voltage of the input signal to the input changeover switch 52.

Figure 10:
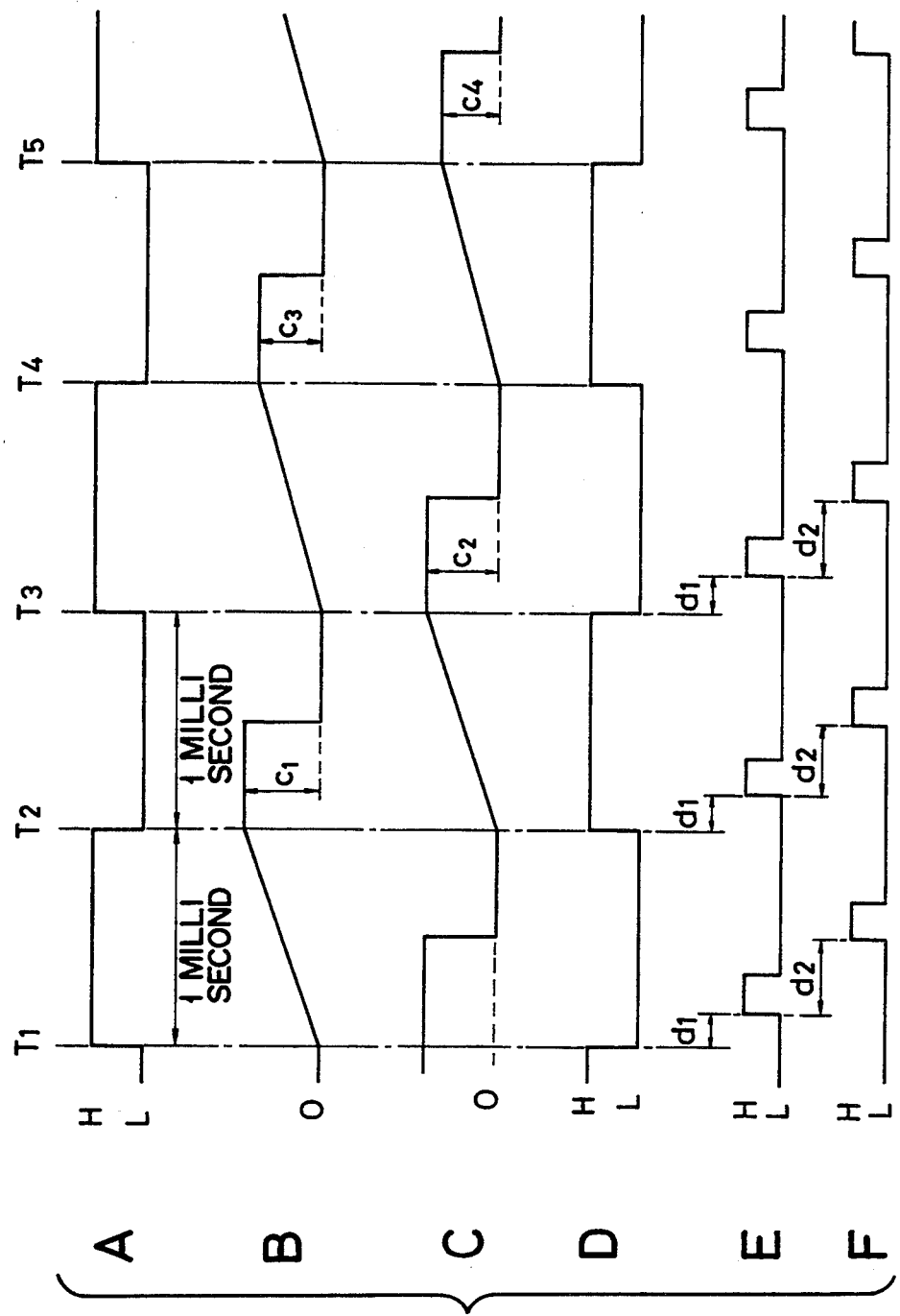
FIG. 10 is a timing chart to illustrate the operation of the A/D converter of FIG. 9.

Then, the level of the input changeover signal rises to level "H" at time T1 as indicated in chart A of FIG. 10 and, after the input changeover switch 52 is turned to the side of the first counter 53, the number it counts is incremented from zero as indicated by chart B in FIG. 10.

When the level of the input changeover signal falls to level "L", the input changeover switch 52 is turned to the side of the second counter 54 so that it starts counting from zero as illustrated in chart C of Fig. At this stage, the count C1 of the first counter 53 for the period of time from T1 to T2 is retained at the output of the counter.

The output changeover signal goes to level "H" while the second counter 54 is operating as shown in chart D of FIG. 10, and, as the count C1 of the first counter 53 has already been sent to the shift register 61, the count C1 is now stored in the shift register 61 by a write pulse which is delayed by d1 relative to T2 as illustrated in chart E of FIG. 10.

When d2 has passed since the issuance of the write pulse, a reset pulse is sent to the first counter 53 as illustrated in chart F of FIG. 10 to reset the first counter to zero as shown in chart C of FIG. 10.

The input changeover signal falls again to level "L" at time T3 that comes 1 millisecond later than time T2 to activate the first counter 53 for counting and, when d1 has elapsed since T3, the count C2 of the second counter 54 is stored in the shift register 61 and then the second counter 54 is reset to zero with a further delay of d2 and become ready for the next counting operation.

In a similar manner the next counted value is stored in the shift register 61 when 1 millisecond has elapsed since the previous count.

When 32 counts, or counts C1 through C33, have been stored in the shift register 61, the output of the adder 62 will be a digital value corresponding to the level the voltage of the analog signal for the 32 milliseconds from T1 to T33. It should be noted that since the output of the V/F converter 50 and the input changeover signal are synchronized and therefore the time required for switching operation is minimal, the counting operations for the period is conducted continuously and no count will be missed during that period. Consequently, the sum of addition of the counts shows a resolution of 16 bits.

When the result of the next subtraction C33 is stored in the shift register 61, the output of the adder 62 shows a digital value that corresponds to the level of the analog voltage for the 32 milliseconds from T2 T3.

Thus, a digital value with a resolution of 16 bits is produced for every 1 millisecond corresponding to the analog signal applied during the period.

While a digital value having a resolution of 16 bits is obtained by adding a given number (32) of consecutive counts stored in the shift register 21 of the A/D converter of FIG. 9, the resolution may be so modified as to meet a required level by storing all the counts for a given period of time an operation such as waveform analysis is involved.

While a number of counts with a resolution of 11 bits are added in the A/D converter in FIG. 9, each of the counts may be alternatively multiplied by $2^5$ in the shift register 61a of FIG. 7 (or five "0" may be added to the count as lower five digits) and M (an arbitrary number) consecutive counts in 16-bit numbers may be added in the adder 62a as a result of counting to obtain the same digital value with a resolution of 16 bits by dividing the sum of the addition by M in the divider 63.

Similarly, while two counters are alternatively used in the A/D converter of FIG. 9, three or more than three counters may be sequentially used for counting the outputs of the V/F converter.

Since an A/D converter having a configuration as described above uses a plurality of counters which are sequentially operated for a given period of time for counting the outputs of the corresponding V/F converter so that the result of a counting operation can be produced as a digital value while one of the remaining counters is operating, the operation of A/D conversion can be carried out with a desired level of resolution and a short period of sampling without requiring high speed counters. This feature provides an electromagnetic balance-type weighing apparatus with the advantage of high accuracy measurement and high speed waveform analysis as described earlier.

FIGS. 11 through 21 show the mechanical system of a second preferred embodiment of the invention as well as the anti-vibration and water-proof contrivances designed to enhance the accuracy of measurement of the apparatus.

In these illustrations, reference numeral 110 denotes a bottom plate removably combined with a cover 170 to form a housing of the apparatus and provided with three legs 111 projecting downward from the front and the rear corners and the middle point of the right edge of the lower surface of the bottom plate (as viewed from the front in FIG. 11) to securely and stably support the apparatus when placed on a flat floor. The bottom plate 110 has a cavity 112 on its upper surface surrounded by a rim 110a.

The bottom plate 110 is provided with a pair of ventilation pores 113 arranged at the middle along its left and right edges (as viewed from the front in FIG. 11) so that the atmosphere and the cavity 112 may communicate with each other.

Figure 15:
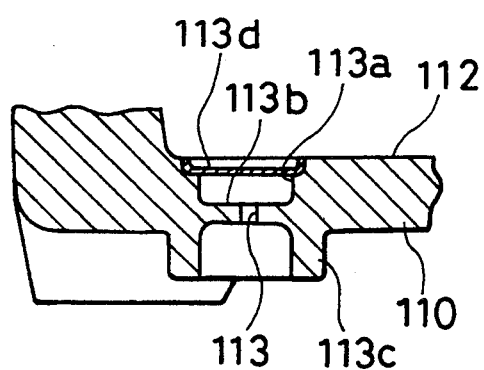
FIG. 15 is an enlarged sectional view of a ventilation pore of the embodiment of FIG. 11.

More specifically, two pairs of countersinks 113b are formed under the cavity 112 of the bottom plate 110, each pair being vertically aligned and the upper one of each pair having an annular step 113a, and each ventilation pore 113 is bored through the center of each pair of the countersinks 113b as illustrated in full detail in FIG. 15. A cylindrical hood 113c is arranged coaxially with each of the ventilation pores 113 and projecting downward from the corresponding lower countersink 113b. The hoods 113a are so designed as to guard the ventilation pores 113 against any liquid that may be bounced to splash the pores from the floor under the apparatus.

A piece of water repellent film 113d that passes air but does not pass liquid is bonded to each of the annular steps 113a of the upper countersinks 113b along its periphery in order to prevent any liquid from entering the inside of the casing but secure ventilation for the inside of the apparatus.

The cavity 112 is also provided with a pair of power cable holes 114 arranged at the middle along the two lateral edges (FIG. 14) and a telecommunication cable hole (not shown).

Figure 16:
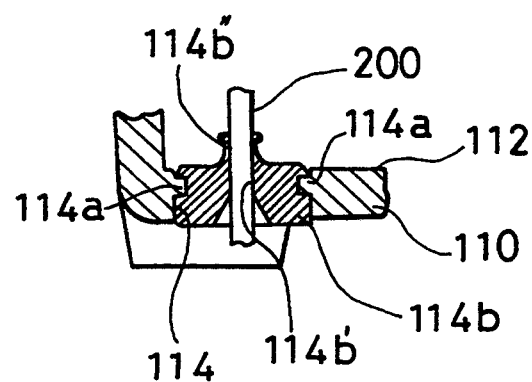
FIG. 16 is an enlarged sectional view of a cable port of the embodiment of FIG. 11.

As shown in FIG. 16, each of the cable holes 114 is provided with an annular projection 114a along its side wall, to which an elastic member 114b made of a material such as rubber is engagedly fitted. Each of the elastic members 114b has an axial through bore 114b', through which a corresponding cable is arranged, any liquid external to the apparatus being prevented from entering it through the cable holes because of an elastic cylinder 114b'' of each of the elastic members 114b firmly pressing the cable running therethrough and airtightly sealing the corresponding cable hole.

Figure 14:
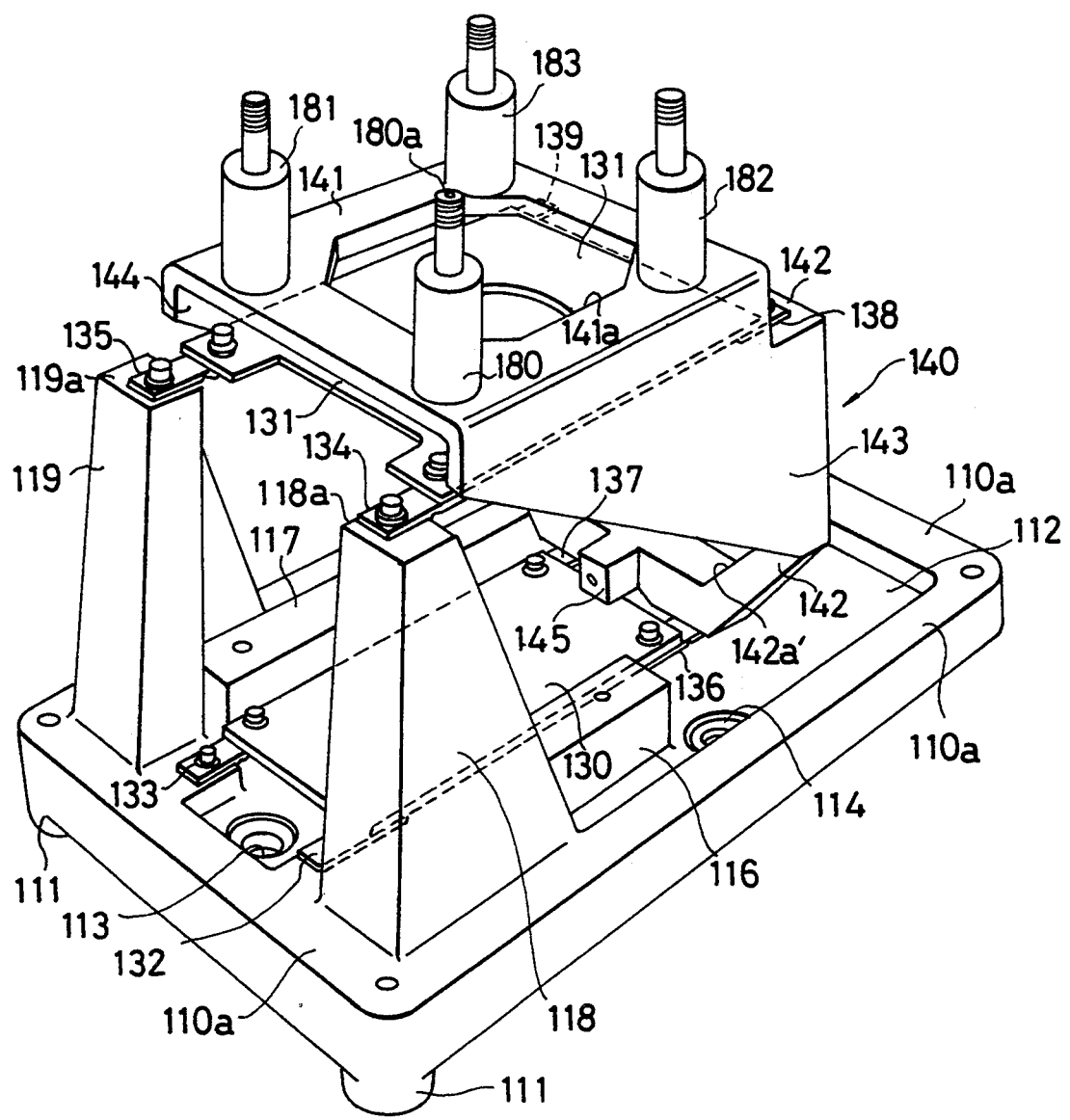
FIG. 14 is a partially cut-out perspective view of the second embodiment similar to FIG. 13 but showing different components.

The bottom plate 110 is also provided with left and right rectangular support blocks 116, 117 (as viewed from the front in FIG. 11) arranged in parallel and standing upward from the cavity 112 for supporting a permanent magnet 122, which will be described later (FIG. 14).

A pair of support pillars 118, 119 are projecting upward from the front and rear left corners of the bottom plate 110.

Figure 11:
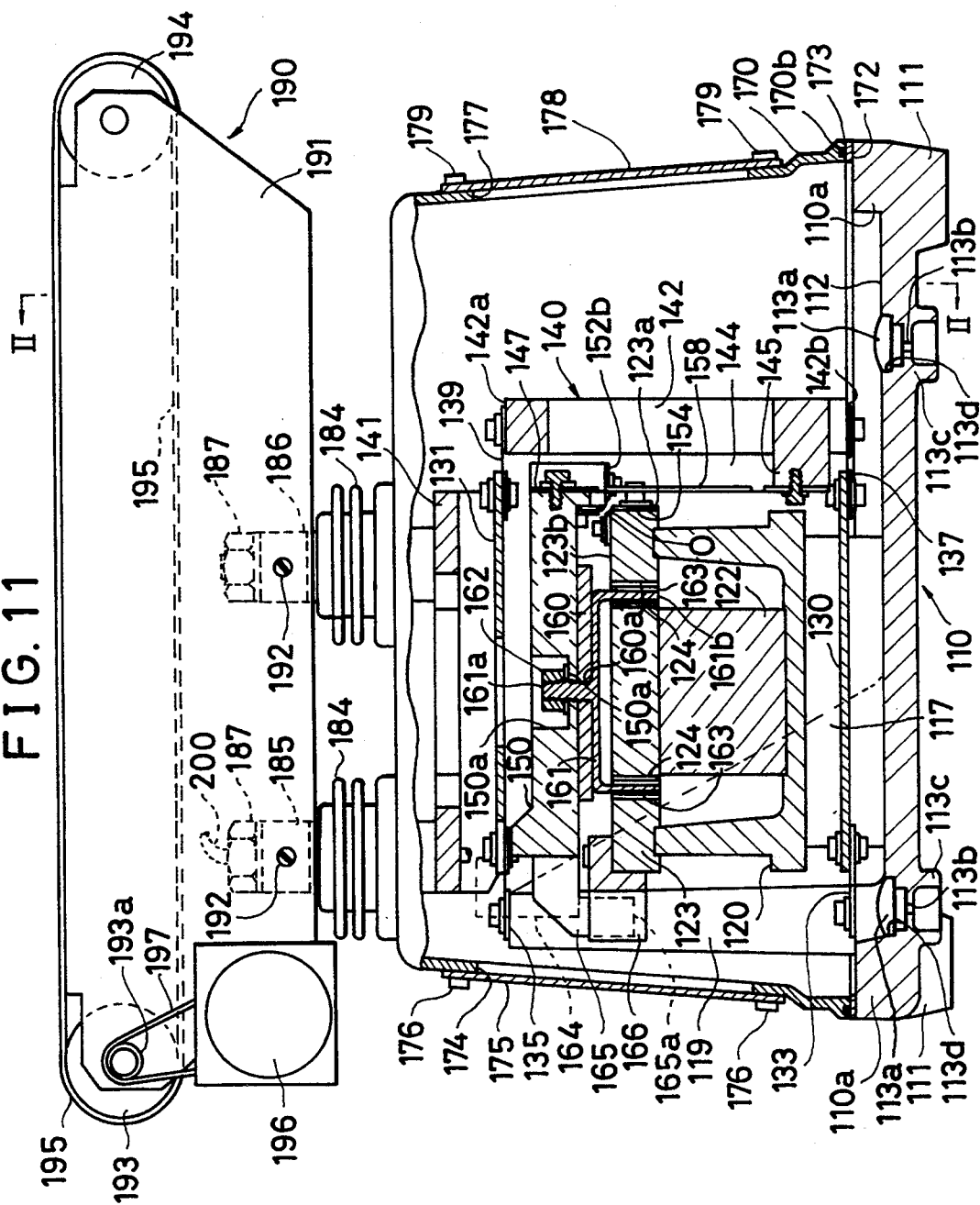
FIG. 11 is a partial sectional view of a second embodiment of the electromagnetic balance-type weighing apparatus of the invention, showing only its mechanical system.
Figure 13:
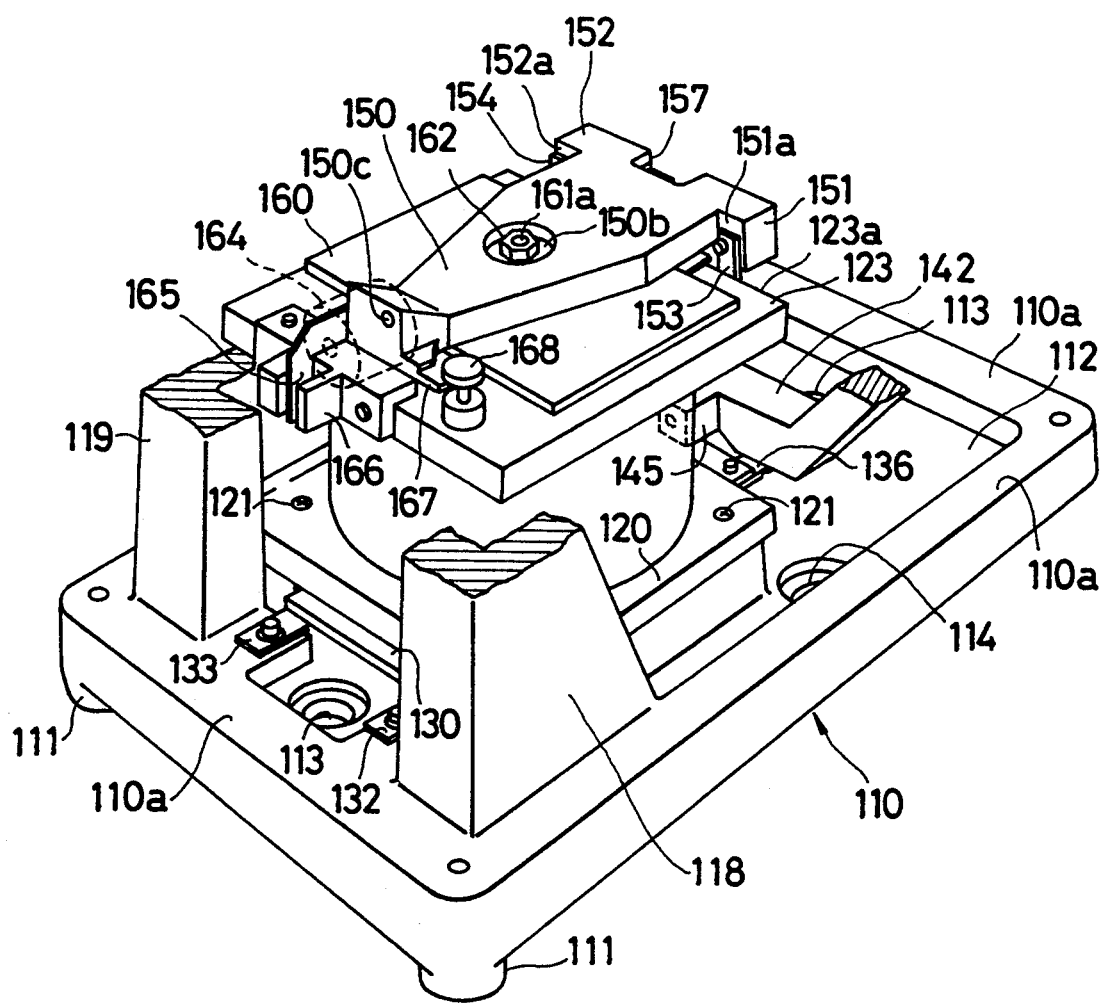
FIG. 13 is a partially cut-out perspective view of the second embodiment, showing only part of the mechanical system as illustrated in FIG. 11.

A yoke 120 is placed on the upper surfaces of the support blocks 116,117 and rigidly fitted thereto means of screws 121 arranged at its four corners as illustrated in FIG. 13. The permanent magnet 122 having a cylindrical shape is rigidly fitted onto the center of the yoke 120 and another yoke 123 is rigidly fitted to the upper surface of the permanent magnet 122 as shown in FIG. 11. The yoke 123 has a circular slit 124 arranged therein.

As shown in FIG. 14, a horizontal plate 130 is fitted to the rim 110a of the bottom plate 110 at its left corners (as viewed from the front in FIG. 11) by way of rocking plates 132, 133 which are found between the support pillars 118,119. As shown in FIGS. 11, 13 and 14, the horizontal plate 130 is located between the support blocks 116, 117 and below the yoke 120.

As shown in FIGS. 11 and 14, a second horizontal plate 131 is fitted to the tops of the support pillars 118, 119 at its left corners by way of rocking plates 134, 135. The horizontal plates 130 and 131 have the same width.

As illustrated in FIG. 14, the load carrying section 140 of the weighing apparatus comprises a horizontal member 141 having a center opening 141a, a vertical member 142 also having a center opening 142a' (FIG. 12) and triangular lateral members 143, 144 connecting the horizontal and vertical members 141 and 142.

Figure 12:
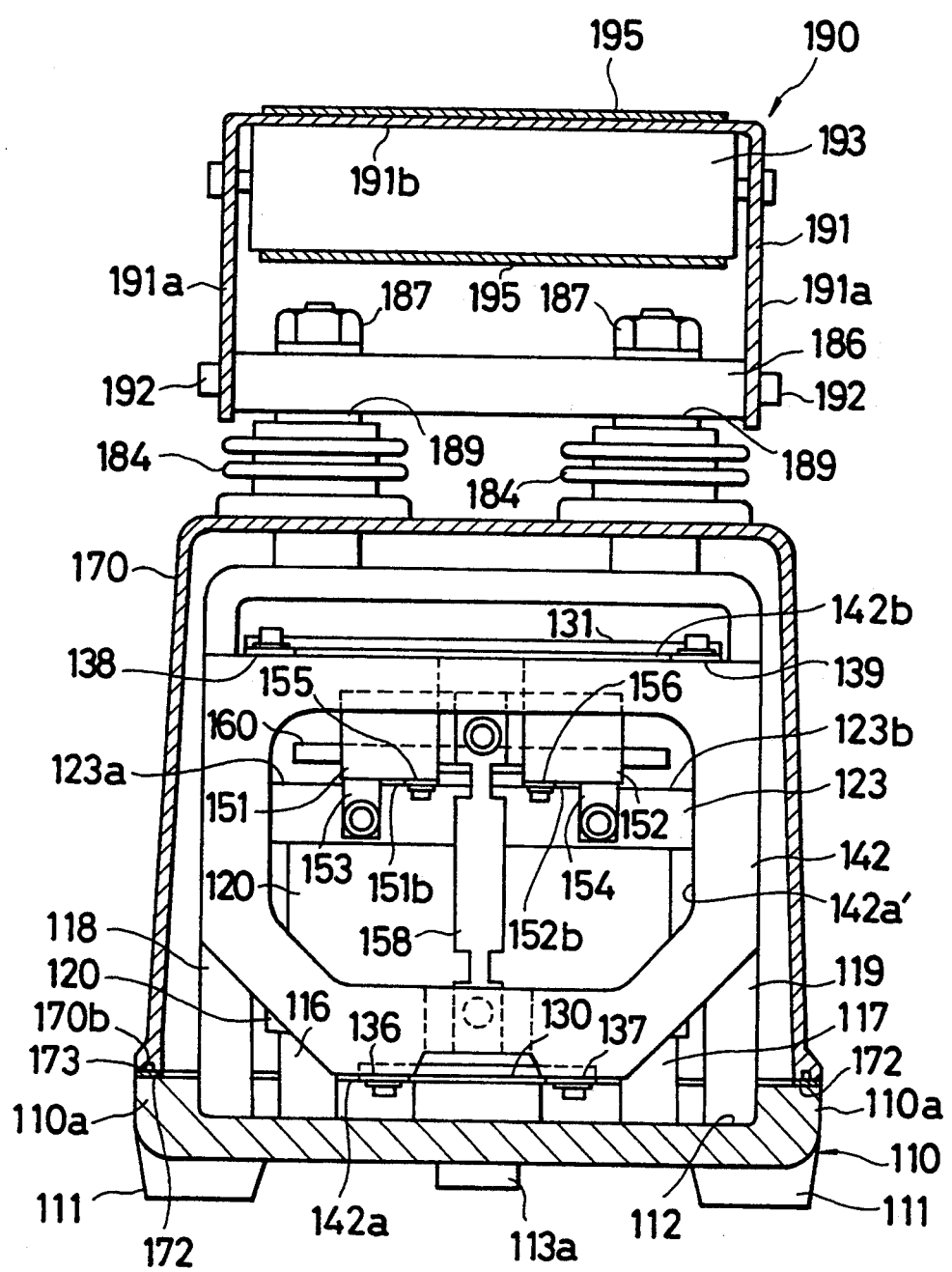
FIG. 12 is a sectional view along II—II line of FIG. 11.

The horizontal plates 130 and 131 are respectively fitted to the bottom and top surfaces 142a and 142b of the vertical member 142 of the load bearing section 140 at their right corners by way of respective rocking plates 136, 137 and 138, 139 (FIGS. 12 and 14).

The rocking plates 132 through 139 are uniformly shaped, each being flexible at a thin middle area. Four of the rocking plates 132 through 139 constitute a front group, while the remaining four constitute a rear group. Each of the front and rear groups are so arranged that, when viewed from the front (FIG. 11), they form a rectangle, which is deformed to become a non rectangular parallelogram whenever a load is applied to the load carrying section 140 so that the upper surface of the load carrying section 140 is lowered.

Balance beam 150 is pivotally fitted to a right top corner of the yoke 123 (as viewed from the front in FIG. 11).

As shown in FIG. 13, the balance beam 150 is realized substantially in the form of a flat plate provided with a pair of flanges 151,152 arranged at the right side corners and projecting outward and downward.

As also shown in FIG. 13, the flanges 151,152 are connected at their respective left lateral sides 151a, 152a to the right lateral side 123a (as viewed from the front in FIG. 11) of said yoke 123 by way of a pair of rocking plates 153, 154 and at their respective bottoms 151b, 152b to the top 123b of the yoke 123 along its right edge by way of another pair of rocking plates 155, 156 (FIG. 12). The rocking plates 153 through 156 are uniformly shaped, each being flexible at a thin middle area. Moreover, the vertically arranged rocking plates 153, 154 are intersected at a single and identical point in the thin middle areas by the horizontal rocking plates 155, 156 so that the balance beam may rotatably sup-ported relative to the yoke 123 at a fulcrum which is the point of intersection O of the vertical rocking plates 153, 154 and the horizontal rocking plates 155, 156 (FIG. 11).

The lateral side of the notch 157 arranged at the right edge of the balance beam 150 (FIG. 13) and the front lateral side of projection 145 projecting leftward from the center of the bottom of the vertical member 142 of the load carrying section 140 (FIG. 14) are connected by a connector plate 158. The connector plate 158 is realized in a form having upper and lower flexible narrow and thin areas as illustrated in FIGS. 11 and 12.

Thus, as the load on the load carrying section 140 is actually applied to the right of said fulcrum 0 due to the existence of the connector plate 158, the balance beam 150 tends to rotate clockwise around the fulcrum 0

A bobbin 161 having an open bottom is provided under the balance beam 150 to the left of said fulcrum 0 with a flat balancing weight 160 arranged therebetween.

More specifically, the fitting axle 161a of the bobbin 161 standing upright from the center of the bobbin main body runs through the through bore 160a of the weight 160 as well as the through bore 150a of the balance beam 150 and is rigidly fitted to the balance beam 150 by means of a nut 162 arranged in the recess 150b of the balance beam 150 so that bobbin 161 and the weight 160 are securely connected to the bottom of the balance beam 150. The cylindrical portion, or peripheral wall, 161b of the bobbin 161 is located in the annular slit 124 of the yoke 123. A wire is wound around the outer periphery of the cylindrical portion 161b to form a coil 163 that constitutes a magnetic circuit crossing the permanent magnet 122 and the slit 124 of the yoke 123 so that, when it is energized by electricity, it tends to rotate the balance beam 150 counterclockwise around the fulcrum 0 with its electromagnetic force.

The balance beam 150 is provided with a threaded bore 150c at its left end so that a weight 164 for finely controlling the balance of the beam (as shown by a broken line in FIGS. 11 and 13) may be fitted there by means of a screw if necessary. The weight 164 is replaceable for fine control or, alternatively, the apparatus may be so arranged that the balance beam is finely controlled by adjusting the position of the weight 164 by means of a screw.

As illustrated in FIGS. 11 and 13, a L-shaped plate 165 is fitted to the left edge of the balance beam 150. The lower end 165a of the L-shaped beam 165 is detected for its position by a position detector 166 comprising light emitter and light sensors and rigidly fitted to the left edge of the yoke 123.

As FIG. 13 shows, the balance beam 150 is provided at its left edge with a fin 167 horizontally projecting from the edge. A stopper 168 is rigidly fitted to the upper surface of the yoke 123 to define the upper and lower limits of vertical movement of the fin 167.

As FIGS. 11 and 12 show, a cover 170 is placed on the top of the rim 110a of the bottom plate 110, the casing of the weighing apparatus being constituted by the bottom plate 110 and the cover 170.

Figure 17:
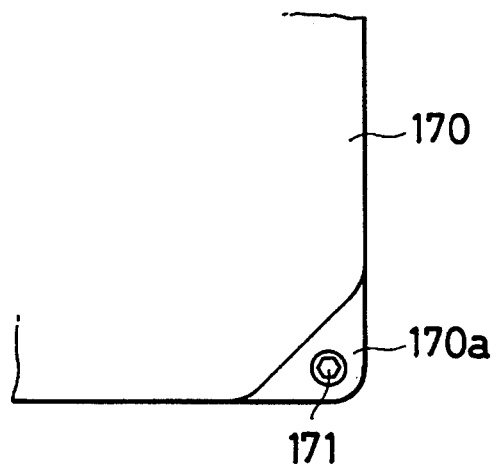
FIG. 17 is a schematic illustration of the casing of the embodiment of FIG. 11, showing how it is anchored.

The cover 170 and the bottom plate 110 are securely connected with each other by means of screws 171 arranged at the flat sections of the four corners of the cover 170 which are located on the respective four corners of the rim 110a of the bottom plate 110 as illustrated in FIG. 17.

In FIG. 11, reference numeral 172 denotes a ring-shaped packing and 170b denotes a closed groove arranged along the bottom of the cover 172, into which the ring-shaped packing 173 is press fit. The ring-shaped packing 173 has a substantially rectangular cross section having upper and lower projections as illustrated in FIG. 18 which are forced to become flat when the ring-shaped packing 173 is press fit into the groove so that it can effectively prevent liquid from entering the inside of the apparatus.

A window 174 is provided at the left side wall (as viewed from the front in FIG. 11) to allow access to the fine control weight 164 for adjustment and/or replacement. A shutter 175 for the window is removably fitted to the side wall by means of screws 176 with a packing (not shown) arranged between the shutter 175 and the side wall for protection against water. Similarly, another window 177 is provided at the right side wall (as viewed from the front in FIG. 11) to allow access to the electronic circuit (not shown) arranged in the inside of the apparatus. Also, a shutter 178 for the window 177 is removably fitted to the side wall by means of screws 179 with a packing (not shown) arranged between the shutter 178 and the side wall for protection against water.

AS illustrated in FIG. 14, four support pillars 180 through 183 are rigidly fitted to and standing from the horizontal member 141 of the load carrying section 140.

Figure 19:
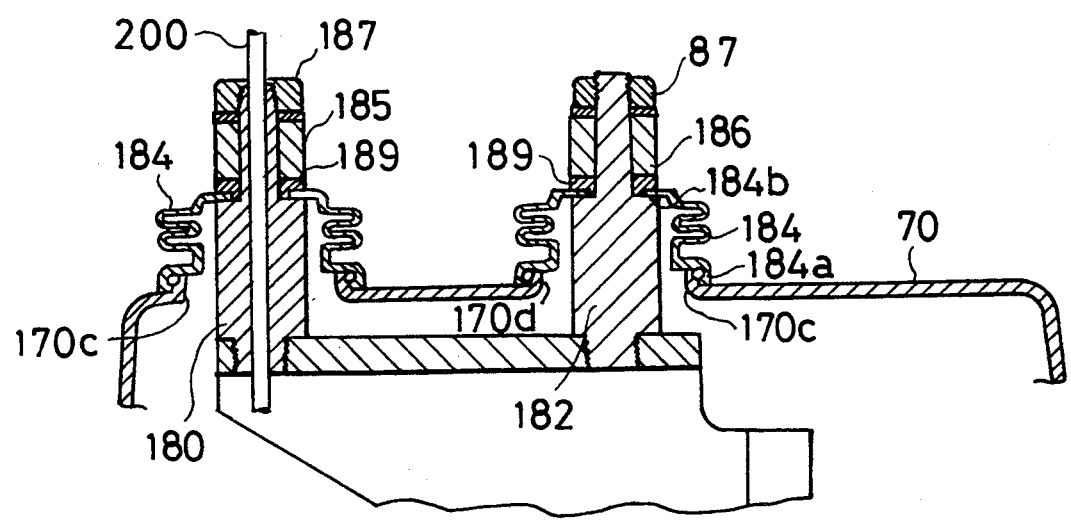
FIG. 19 is a sectional view of the principal area of the weight-sensing portion of the embodiment of FIG. 11.
Figure 22:
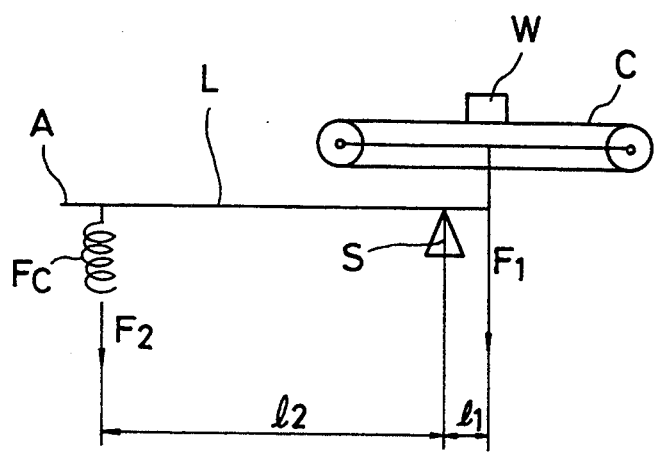
FIG. 22 is a schematic view of a known electromagnetic balance-type weighing apparatus, depicting the underlying theory.
Figure 23:
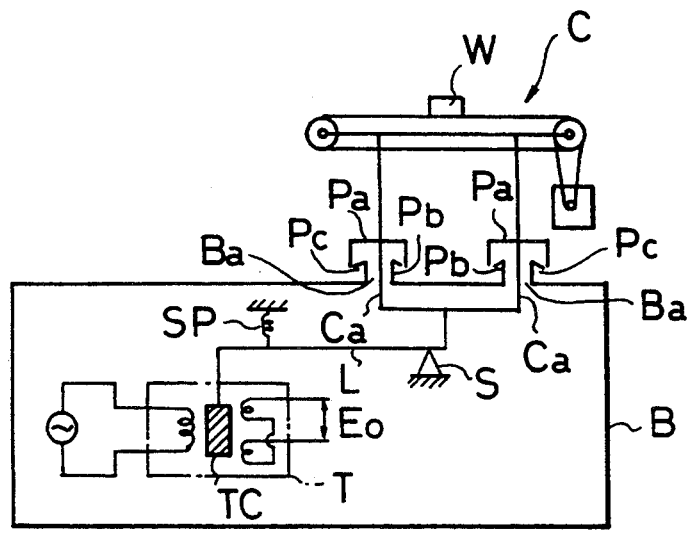
FIGS. 23 and 24 are two different schematic views similar to FIG. 22 but depicting different underlying theories.
Figure 24:
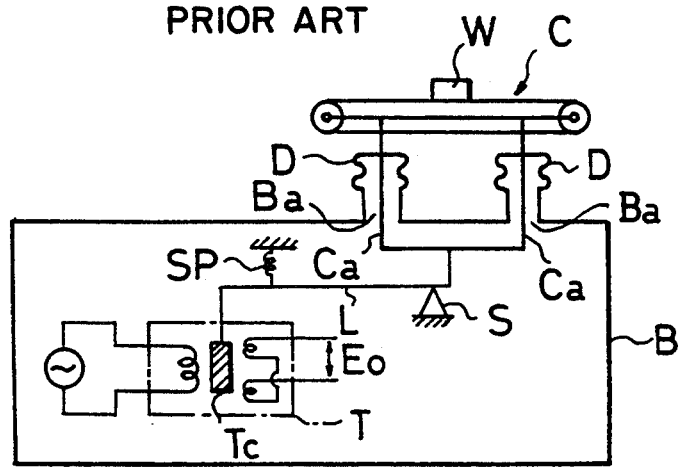

It is seen in FIG. 19 that the support pillars 180 through 183 are standing upright through holes 170c of the top wall of the cover 170. A vertically extendible bellows 184 is arranged between the peripheral edge of each of the holes 170c and the corresponding one of the support pillars 180 through 183 so that the support pillars 180 through 183 are vertically slidable without hindrance but the watertight condition of the casing is preserved.

More specifically described by referring to FIG. 19, each of the holes 170c of the cover 170 has a flange 170d standing upward, to whose outer upper periphery an 0-ring is engagedly fitted, and the lower end 184a of the corresponding bellows 184 adheres to the flange 170d of the cover 170 due to its centripetal resilient force, while the upper end 184b of the bellows 184 is pressed downward by a washer 189, which will be described later, so that the watertight condition of the casing is perfectly secured.

The two paired support pillars 180, 181 and 182, 183 are provided with respective common beams 185 and 186, which are longitudinally arranged and securely held to the respective proper positions by means of anchor bolts 187 and washers 189, the latter being arranged between the respective bolts 187 and the beams 185, 186 (FIGS. 11, 12 and 16).

A conveyor assembly 190 that operates as a weighing pan is securely held by the opposite ends of the beams 185, 186, as the front and rear panels 191a of the frame 191 of the conveyor assembly 190 are rigidly fitted to the beams 185, 186 by means of screws 192. Rollers 193 and 194 are rotatably supported by the front and rear panels 191a and a conveyor belt 195 is arranged between the rollers 193 and 194. The conveyor belt 195 is so arranged that it is kept in contact with the top panel 191b of the frame 191 at the upper end of it so that the conveyor belt 195 may not sink under the load of the object of weighing W applied to it (FIGS. 11 and 12).

The roller 193 is driven to rotate by a motor 196 securely fitted to the frame 191. In FIG. 11, 193a denotes a pulley securely fitted to the roller 193 and 197 denotes a belt connecting the pulley 193a and a pulley (not shown) arranged on the motor 196.

As illustrated in FIG. 14, the support pillar 180 is realized as a hollow pipe, through which a power cable 200 (FIG. 11) runs to be led outside by way of a through bore 180a of the top to reach the motor 196.

The watertight condition of the casing is secured and any possibility of liquid entering there by way of the through bore 180a for the support pillar 180 can be eliminated by arranging either an elastic tube around the cable 200 and the support pillar 180 as illustrated in FIG. 20 or an 0-ring 202 press fit into the space between the cable 200 and the anchor bolt 187.

with an arrangement as described above, at the right of the fulcrum 0, the balance beam 150 is subjected to a rotary force trying to drive it clockwise by the load applied to the connector plate 158 by the entire conveyor assembly 190, the motor 196 and the load carrying section 140, whereas, at the left of the fulcrum O, it is subjected to another rotary force trying to drive it counterclockwise by the load applied by the balancing weight 160 and the weight for fine control 164 and the sucking force of the energized coil 163.

The vertical position of the lower end 165a of the L-shaped plate 165 rigidly fitted to the left edge of the balance beam 150 is detected by the position detector 166 and utilized to regulate the sucking force of the coil 163 by adjusting the rate of the electric current supplied to the coil so that consequently the lower end 165a of the L-shaped is returned to its normal position.

Therefore, the rate of the electric current supplied to the coil 163 should be so adjusted that the lower end 165a of the L-shaped plate 165 is found exactly at its normal position when the conveyor belt 195 does not carry any objects of weighing.

It may be understood that, because of the weight 160 (and the weight for fine control 164 if necessary) are fitted to the balance beam 150, the rate of the electric current supplied to the coil 163 when the conveyor belt 195 does not carry any objects can be minimized.

when an object of weighing is placed on the conveyor belt 190 by a feeder (not shown), the balance beam 150 tends receive a clockwise rotary force by the weight of the object of weighing and the L-shaped plate 165 at the left edge of the balance beam 150 shows an upward movement deviating itself from the normal position, a movement which is suppressed by the increased sucking force of the coil 163 generated by a corresponding increase in the rate of the electric current supplied to the coil 163. The weight of the object of weighing is then determined by the rate or the increase in the rate of electric current.

As described earlier, the space between the pillars 180 through 183 supporting the weighing pan and the cover 170 is sealed by the bellows 184 and the space surrounding the cable 200 in the through bore 180a of the pillar 180 is also sealed by an appropriate measure as illustrated in FIG. 20 or FIG. 21. Moreover, the cable hole 114 of the bottom plate 110 is protected against liquid. Therefore, the weighing apparatus within the casing is completely free from the risk of being wet if the conveyor belt 190 is washed with water for cleaning.

Besides, since the ventilation pores 113 through the bottom plate 110 are covered by hoods 113c and provided with pieces of water repellent film 113d, the apparatus is protected against any liquid that may be bounced to splash the bores from the floor under the apparatus.

It may be needless to say that, while the mechanical system as described above for the second embodiment of the invention is particularly good for a weighing apparatus that requires water-proof features, it may also be applied to a weighing apparatus that does not need to be protected against water.

It may be clear that, since the mechanical system of the second embodiment as described above comprises a balancing weight 160 arranged between the balance beam 150 and the bobbin 161 of the electromagnetic coil, the apparatus is free from any significant imbalance that may be caused within the weighing apparatus by the dead weight of the weighing pan so that the rate of the electric current supplied to the electromagnetic coil and hence the heat to be inevitably generated by the electric current can be minimized. Non-existence of significant imbalance within the weighing apparatus means that the balance beam 150 is scarcely affected by external vibrations such as those of the floor supporting the apparatus and therefore fast and accurate weighing operations are guaranteed.

Moreover, the mechanical system of the second embodiment is completely protected against any intrusion of liquid because all the space between the casing and the support pillars projecting outward through the holes is completely sealed by means of elastic members. Besides, since the inside and the outside of the casing are in communication with each other by way of ventilation pores and therefore the elastic members are not undesirably expanded nor contracted by temperature changes within the casing, readings of the weighing apparatus are not affected by temperature changes.

It may be needless to say that the balance beam 150 may be so adjusted that it is balanced under either loaded or unloaded conditions either by altering the shape, weight or fitting position of either the balancing weight 160 or the weight for fine control 164 or, alternatively, by means of the balance beam 150 itself or an accessory.

As described above in detail, the present invention provides a fast-responsive, highly accurate and therefore highly reliable electromagnetic balance-type weighing apparatus.

Industrial Applicability

An electromagnetic balance-type weighing apparatus according to the present invention may have a variety of applications in various industrial fields to establish a fully automated weighing system such as a high-speed automatic weighing and sorting system for works to be installed in a manufacturing line.

What is claimed is:

1. An electromagnetic balance-type weighing apparatus comprising:

weighing pan means for holding an object of weighing having a weight, said weighing pan means being displaceable as a function of the weight of the object of weighing placed thereon;

electromagnetic coil means for generating an electromagnetic force to counterbalance a displacement of said weighing pan means;

displacement detector means for detecting the displacement of said weighing pan means and for providing a detection signal in response thereto;

operation means having an input terminal and an output terminal for providing a control voltage in accordance with the detection signal from said displacement detector means, said input terminal being coupled to said detector means;

first resistor means for transmitting said control voltage provided by said operation means, said first resistor means having one end and another end, the one end being connected to said output terminal of said operation means;

driving amplifier means for amplifying and outputting said control voltage, said driving amplifier means having an inverted input terminal, a non-inverted input terminal and an output terminal, said inverted input terminal being connected to said another end of said first resistor means, said output terminal being connected to one end of said electromagnetic coil means;

second resistor means for determining a reference potential of said driving amplifier means, said second resistor means being connected between said non-inverted input terminal of said driving amplifier means and a reference potential point;

third resistor means for generating a voltage which corresponds to a current supplied to said electromagnetic coil means from the output terminal of said driving amplifier means, said third resistor means being connected between another end of said electromagnetic coil means and the reference potential point;

buffer amplifier means for amplifying and outputting the voltage generated by said third resistor means, said buffer amplifier means having an inverted input terminal, a non-inverted input terminal and an output terminal, said non-inverted input terminal being connected to a contact point between the other end of said electromagnetic coil means and said third resistor means, said inverted input means being connected to said output terminal; and fourth resistor means for providing a feedback voltage in accordance with a predetermined ratio, outputted from the output terminal of said buffer amplifier means, to the inverted input terminal of said driving amplifier means, said fourth resistor being connected between the output terminal of said buffer amplifier means and the inverted input terminal of said driving amplifier means, said predetermined ratio being determined by a ratio of a value of said first resistor means to that of said fourth resistor means; and weight calculator means for calculating the weight of the object of weighing according to an output voltage from the output terminal of said buffer amplifier means;

wherein said electromagnetic coil means is in a negative feedback loop to said driving amplifier means, and is driven by electric current supplied from said buffer amplifier means, so that the electric current quickly responds to changes in load applied to said weighing pan means and so that a time from detection of a change in load caused by the object of weighing to determination of the weight of the object is reduced.

2. An electromagnetic balance-type weighing apparatus according to claim 1, wherein said operation means comprises means for performing operations on parameters of the apparatus so as to reduce the detection signal from the displacement detector means close to zero.

3. An electromagnetic balance-type weighing apparatus according to claim 1, wherein:

said apparatus further comprises A/D converter means for converting the output voltage from said buffer amplifier means into a digital signal with a predetermined timing; and said weight calculator means comprises means for calculating the weight of the object of weighing according to the digital signal transmitted from said A/D converter means.

4. An electromagnetic balance-type weighing apparatus according to claim 3, wherein said A/D converter means comprises:

V/F converter means for generating and transmitting an output signal with a frequency corresponding to an amplitude of an analog input signal;

counter means for continuously counting a number of output signals transmitted from said V/F converter means; and subtracter means for periodically sampling a count value of said counter means and for generating a digital signal representing the difference between two consecutive counts for each and every period.

5. An electromagnetic balance-type weighing apparatus according to claim 3, wherein said A/D converter means comprises:

V/F converter means for generating and transmitting an output signal with a frequency corresponding to an amplitude of an analog input signal;

a plurality of counter means for counting a number of output signals transmitted from said V/F converter means;

counter input changeover means for transmitting output signals to a selected counter for a given period of time; and counter output changeover means for transmitting a digital signal representing a counting value of the selected counter after the end of said given period of time.

6. An electromagnetic balance-type weighing apparatus comprising:

weighing pan means for holding an object of weighing having a weight, said weighing pan means being displaceable as a function of the weight of the object of weighing placed thereon;

electromagnetic coil means for generating an electromagnetic force to counterbalance a displacement of said weighing pan means;

displacement detector means for detecting the displacement of said weighing pan means and for providing a detection signal in response thereto;

operation means having an input terminal and an output terminal for providing a control voltage in accordance with the detection signal from said displacement detector means, said input terminal being coupled to said detector means;

first driving amplifier means for amplifying and outputting the control voltage provided by said operation means at a voltage gain of one, said first driving amplifier means having an inverted input terminal, a non-inverted input terminal and an output terminal, said non-inverted input terminal being connected to said output terminal of said operation means, said inverted input terminal and said output terminal of said first driving amplifier means being directly connected to each other;

first resistor means for transmitting a current corresponding to the voltage which is output from the output terminal of said first driving means, said first resistor means, having one end and another end, said one end being connected to the output terminal of said first drive amplifier means;

second driving amplifier means for amplifying and outputting the current transmitted by said first resistor means, said second driving amplifier means having an inverted input terminal; a non-inverted input terminal and an output terminal, said inverted input terminal being connected to said another end of said first resistor means, said output terminal being connected to one end of said electromagnetic coil means, and said non-inverted input terminal connected to a reference potential;

second resistor means for providing a feedback current in accordance with a predetermined ratio, supplied to said electromagnetic coil means from the output terminal of said second driving amplifier means, to said second driving amplifier means, thereby counterbalancing the current transmitted by said first resistor means, said second resistor means having one end and another end, said one end being connected to another end of said electromagnetic coil means, said another end of said second resistor means being connected to the inverted input terminal of said second driving amplifier means, said predetermined ratio being determined by a ratio of a value of said first resistor means to that of said second resistor means;

differential amplifier means for amplifying and outputting a voltage between the one end and the another end of said second resistor means; and weight calculating means for calculating the weight of the object of weighing according to an output voltage from an output terminal of said differential amplifier means, wherein said electromagnetic coil means is in a negative feedback loop to said second driving amplifier means, and is driven by electric current supplied from said second driving amplifier means, so that the electric current quickly responds to changes in load applied to said weighing pan means and so that a time from detection of a change in load caused by the object of weighing to determination of the weight of the object is reduced.

7. An electromagnetic balance-type weighing apparatus according to claim 6, wherein said operation means comprises means for performing operations on parameters of the apparatus so as to reduce the detection signal from the displacement detector means close to zero.

8. An electromagnetic balance-type weighing apparatus according to claim 6, wherein:

said apparatus further comprises A/D converter means for converting the output voltage from said differential amplifier means into a digital signal with a predetermined timing; and said weight calculator means comprises means for calculating the weight of the object of weighing according to the digital signal transmitted from said A/D converter means.

9. An electromagnetic balance-type weighing apparatus according to claim 8, wherein said A/D converter means comprises:

V/F converter means for generating and transmitting an output signal with a frequency corresponding to an amplitude of an analog input signal;

counter means for continuously counting a number of output signals transmitted from said V/F converter means; and subtracter means for periodically sampling a count value of said counter means and for generating a digital signal representing the difference between two consecutive counts for each and every period.

10. An electromagnetic balance-type weighing apparatus according to claim 8, wherein said A/D converter means comprises:

V/F converter means for generating and transmitting an output signal with a frequency corresponding to an amplitude of an analog input signal;

plurality of counter means for counting a number of output signals transmitted from said V/F converter means;

counter input changeover means for transmitting output signals to a selected counter for a given period of time; and counter output changeover means for transmitting a digital signal representing a counting value of the selected counter after the end of said given period of time.

* * * * *

UNITED STATES PATENT AND TRADEMARK OFFICE
CERTIFICATE OF CORRECTION

PATENT NO. : 5,367,128
DATED : 22 November 1994
INVENTOR(S) : Fumihiro Tsukasa et al It is certified that error appears in the above-identified patent and that said Letters Patent is hereby corrected as shown below:

On the Title Page, under Section [75] Inventors,

Delete "; Kazuhiko Horikoshi, Atsugi; Osamu Tanaka, Atsugi, Kunio Kikuchi, Minamiashigara"

Under Section [30] Foreign Application Priority Data,
Delete "Aug. 21, 1989 [JP] Japan....1-214558"
Delete "Mar. 31, 1990 [JP] Japan....2-87274"

Signed and Sealed this

Eighteenth Day of April, 1995

*Attest:*

BRUCE LEHMAN

*Attesting Officer*  *Commissioner of Patents and Trademarks*